(12) United States Patent
Sekiguchi

(10) Patent No.: US 7,443,464 B2
(45) Date of Patent: Oct. 28, 2008

(54) LIQUID CRYSTAL DISPLAY UNIT

(75) Inventor: Kanetaka Sekiguchi, Sayama (JP)

(73) Assignee: Citizen Holdings Co., Ltd., Tokyo (JP)

( * ) Notice: Subject to any disclaimer, the term of this patent is extended or adjusted under 35 U.S.C. 154(b) by 492 days.

(21) Appl. No.: 11/086,180

(22) Filed: Mar. 23, 2005

(65) Prior Publication Data

US 2005/0212995 A1   Sep. 29, 2005

(30) Foreign Application Priority Data

Mar. 23, 2004  (JP)  ............................. 2004-083759
Jan. 5, 2005   (JP)  ............................. 2005-001022

(51) Int. Cl.
*G02F 1/13*    (2006.01)
*G02F 1/1335*  (2006.01)

(52) U.S. Cl. ........................... 349/96; 349/194; 349/98; 349/117; 349/119; 349/95; 349/114; 349/115

(58) Field of Classification Search .................. 349/96, 349/95, 98, 114–115, 117, 119, 194
See application file for complete search history.

(56) References Cited

U.S. PATENT DOCUMENTS

| 6,597,418 B2* | 7/2003 | Moon et al. ................. 349/98 |
| 6,621,543 B2* | 9/2003 | Moon ........................ 349/115 |
| 6,690,438 B2* | 2/2004 | Sekiguchi ................... 349/114 |
| 6,734,923 B2* | 5/2004 | Kwon et al. .................. 349/15 |
| 7,161,647 B2* | 1/2007 | Iijima ....................... 349/113 |
| 2001/0017679 A1 | 8/2001 | Ha et al. |
| 2003/0025863 A1* | 2/2003 | Iijima ....................... 349/122 |
| 2004/0027510 A1 | 2/2004 | Lijima et al. |
| 2004/0189906 A1 | 9/2004 | Kim |

FOREIGN PATENT DOCUMENTS

| JP | 09-506984 A   | 7/1997 |
| JP | 2003-228059 A | 8/2003 |
| JP | 2003-302628 A | 10/2003 |
| WO | WO 95-17699 A1 | 6/1995 |

* cited by examiner

*Primary Examiner*—Andrew Schechter
*Assistant Examiner*—Hoan C Nguyen
(74) *Attorney, Agent, or Firm*—Sughrue Mion, PLLC

(57) ABSTRACT

A partial polarization member is provided on a second substrate. The partial polarization member is provided corresponding to an aperture of a reflection film, and is not provided in other areas that overlap with reflectors of a reflection film. Therefore, light that is incident from a backlight is reflected by the reflection film and returns to the backlight, without generating loss due to absorption or the like. The light that returns to the backlight is reflected by a backlight reflection film of the backlight, and is output to the aperture of the reflection film.

22 Claims, 11 Drawing Sheets

LIQUID CRYSTAL DISPLAY UNIT

BACKGROUND OF THE INVENTION

1) Field of the Invention

The present invention relates to a liquid crystal display unit that functions as both a reflective type liquid crystal display unit and a transmissive type liquid crystal display unit.

2) Description of the Related Art

Generally, a portable information device includes a transmissive type liquid crystal display unit that has no light emitting function, and performs a display using light from a light source incorporated in the device. The device can include, other than the transmissive type liquid crystal display unit, a reflective type liquid crystal display unit that performs a display using light from the outside, or a transflective type liquid crystal display unit that has both functions of the transmission and the reflective types, and the like.

In the transflective type liquid crystal display unit, a reflection film that has a plurality of reflectors having a small transmission factor and a plurality of apertures having a large transmission factor is formed on one of a pair of substrates that sandwich a liquid crystal layer, on the surface of the substrate facing the liquid crystal layer. The display unit functions as a reflective type display unit by using light that is incident from the outside to a liquid crystal display element and reflected by the reflection film with a reflection characteristic. The display unit also functions as a transmissive type display unit by using light that is emitted from the light source within the device and that passes through the aperture of the reflection film. FIG. 22 is a cross-section of a conventional transflective type liquid crystal display unit.

A liquid crystal layer 18 is filled in a space between a first substrate 1 and a second substrate 5, and the space is sealed. A first electrode 2 and an orientation film 27 made of a transparent electric conductive film are provided on the surface of the first substrate 1 facing the liquid crystal layer 18. A reflection film 21 having a reflector made of an aluminum film is provided on the surface of the second substrate 5 facing the liquid crystal layer 18. An aperture 22 is provided on the reflection film 21. A light transmission factor of the aperture 22 is larger than that of the reflector (that is, the aluminum film part) of the reflection film 21. The reflection film 21 is covered with an insulation film 23 made of acrylic resin. A second electrode 6 and an orientation film 28 made of a transparent electric conductive film are provided on the surface of the insulation film 23. Each area in which the first electrode 2 and the second electrode 6 overlap each other corresponds to a pixel. Each pixel is provided with the reflector and the aperture of the reflection film.

The first substrate 1 and the second substrate 5 are adhered to each other using a sealing member 16, with a predetermined gap therebetween. A space surrounded by the first substrate 1, the second substrate 5, and the sealing member 16, is sealed with a sealer (not shown), including the liquid crystal layer 18 therein. An upper polarizing film 31 is provided on the surface of the first substrate 1 at an observer side, that is, on the surface opposite to the liquid crystal layer 18. A retardation film 34 is provided on the surface of the second substrate 5 opposite to the liquid crystal layer 18. A lower polarizing film 45 is provided on the surface of the retardation film 34. The retardation film 34 and the lower polarizing film 45 are adhered to each other with a transparent adhesive material (not shown).

A backlight 41 having a backlight reflection film 42 is provided as an auxiliary light source at a lower side of the lower polarizing film 45. Light emitted from the backlight 41 is directly incident to the aperture 22 of the reflection film 21 and passes through the liquid crystal layer 18, to become a first transmission light-flux 55 that is output to the observer side. The light from the backlight 41 also repeats reflection from the reflector of the reflection film 21, and a reflection from the backlight 41 or the backlight reflection film 42, reaches the aperture 22, then passes through the aperture 22 and the liquid crystal layer 18, to become a second transmission light-flux 56 that is output to the observer side.

Each time when the light that becomes the second transmission light-flux 56 repeats a reflection between the reflector of the reflection film 21 and the backlight reflection film 42, the light passes through the lower polarizing film 45, and is slightly absorbed by the lower polarizing film 45. Therefore, the light that becomes the second transmission light-flux 56 gradually loses intensity while being reflected between the reflector of the reflection film 21 and the backlight reflection film 42. As a result, the light becomes weak when the light is output to the observer side as the second transmission light-flux 56. On the other hand, an incident light 51 from the outside passes through the liquid crystal layer 18, is reflected from the reflector of the reflection film 21, passes through the liquid crystal layer 18 again, and is output to the observer side as a reflection light 52.

In the transflective type liquid crystal display unit, light utilization efficiency, and thereby efficiency of outputting the light emitted from the backlight to the observer side, has been improved by providing a reflection polarizing film between the lower polarizing film and the backlight, and by disposing the transmission polarization axis of the reflection polarizing film and the transmission polarization axis of the lower polarizing film in parallel (for example, see Japanese Patent Application National Publication No. H09-506984). Of the light that is emitted from the backlight, the light that is incident to the reflection polarization axis of the reflection polarizing film is reflected from the reflection polarizing film and returns to the backlight. Subsequently, a polarization cancellation and a reflection occur on the backlight, and the backlight emits light again to the reflection polarizing film.

A part of the light parallel with the transmission polarization axis of the reflection polarizing film is directly output from the aperture of the reflection film. The light that is incident to the reflector of the reflection film is reflected from the reflector of the reflection film to the reflection polarizing film side, and is then reflected by the reflection polarizing film. As explained above, the light reflected by the reflection polarizing film and the light reflected by the backlight are mixed, and the mixed light is output to the observer side, thereby increasing the amount of the light output to the observer side, and realizing bright display.

Furthermore, a transmissive type liquid crystal display unit has been suggested to improve brightness of the reflection light and the transmission light-flux from the transflective type liquid crystal display unit. The transmissive type liquid crystal display unit has a polarizing film (that is, an embedded polarizing film) on the surface of the second substrate facing the liquid crystal layer (for example, see Page 3 and FIG. 7 of Japanese Patent Application Laid-Open No. 2003-302628). Another liquid crystal display unit having a reflection polarization layer that has plural fine slit apertures provided on a metal reflection film, is also proposed (for example, see Pages 2 and 3 of Japanese Patent Application Laid-Open No. 2003-228059).

However, the configuration disclosed in the Japanese Patent Application National Publication No. H09-506984 is not preferable for thinning and weight saving, which are important for compact portable devices, and thereby increasing cost. Besides, since the reflection polarizing film and the transmission polarization axis of an absorption polarization axis need to be laminated in alignment, a yield ratio can be reduced due to dusts and foreign matter between both polarizing films. Further, colors can change due to an in-plane variance of polarization degrees of the reflection polarizing film, particularly due to a variance of polarization degrees in a visible light area, which can lead to a change in display colors.

An absorption polarizing film and a reflection polarizing film are laminated in this order, even if a reflection film having an aperture is used, on the second substrate that is provided at the backlight side, which increases cost. There are also problems of a generation of dusts at the lamination time, and a generation of loss due to light absorption by the absorption polarizing film. Further, since the backlight needs to have the polarization cancellation function and the reflection function, the backlight configuration has no degree of freedom, and cost increase and performance reduction occur due to the addition of functions. On the other hand, the configuration disclosed in the Japanese Patent Application Laid-Open No. 2003-302628 has many problems yet to be solved regarding a setting position of the embedded polarizing film and a combination with other components.

SUMMARY OF THE INVENTION

It is an object of the present invention to at least solve the problems in the conventional technology.

A liquid crystal display unit according to an aspect of the present invention includes: a first substrate; a second substrate; a liquid crystal layer that is sandwiched between the first substrate and the second substrate; a first electrode that is provided on the first substrate; a second electrode that is provided, corresponding to a pixel on a display, on the second substrate; a reflection film that is provided on the second substrate and includes a plurality of reflectors that is provided, corresponding to the pixel, with a space therebetween; an auxiliary light source that is provided on an opposite side of the second substrate with respect to the first substrate; and a partial polarization member that is provided, corresponding to the space, between the reflection film and the auxiliary light source.

The other objects, features, and advantages of the present invention are specifically set forth in or will become apparent from the following detailed description of the invention when read in conjunction with the accompanying drawings.

DETAILED DESCRIPTION

Figure 1:
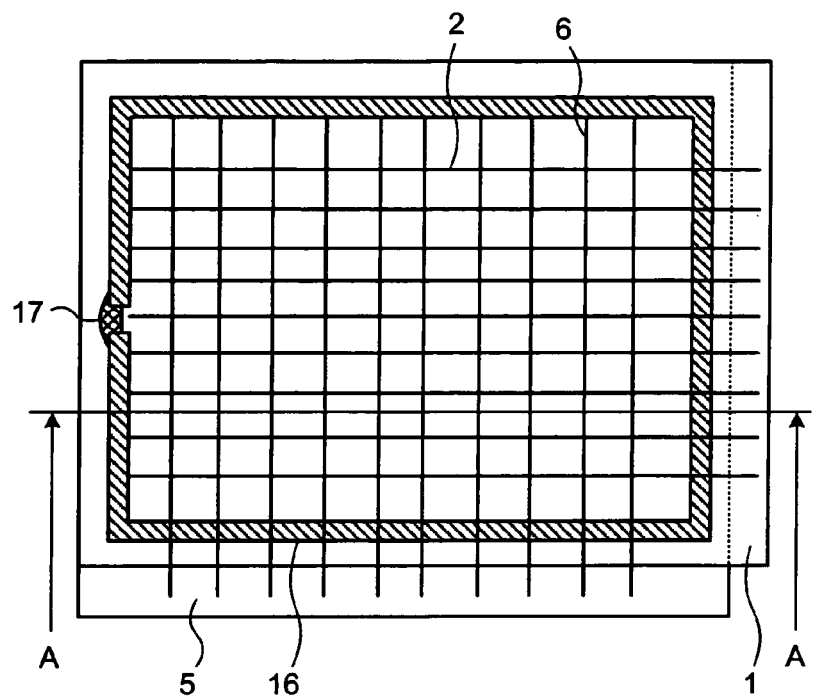
FIG. 1 is a top plan view of a liquid crystal display unit according to a first embodiment.

Exemplary embodiments of a liquid crystal display unit according to the present invention will be explained in detail with reference to the accompanying drawings. Like reference numerals designate like configurations in all the drawings and redundant explanation is omitted.

According to the present invention, a polarization member is provided between a reflection film having an aperture and an auxiliary light source. The polarization member is provided at a portion which spatially overlaps with the aperture of the reflection film. The polarization member is not provided at a portion which spatially overlaps with the reflector of the reflection film. "Spatially overlap" means to overlap when being observed by an observer (a user) of the liquid crystal display unit.

The partial polarization member can be provided on the surface of the second substrate facing a liquid crystal layer, or can be provided on the surface of the second substrate opposite to the liquid crystal layer. A part of light emitted from the auxiliary light source repeats a reflection between the reflection film and the reflection film of the auxiliary light source, and after the reflection, is output from the aperture of the reflection film through the partial polarization member. Therefore, brighter display can be realized when the liquid crystal display unit is used as a transmissive type liquid crystal display unit.

Figure 2:
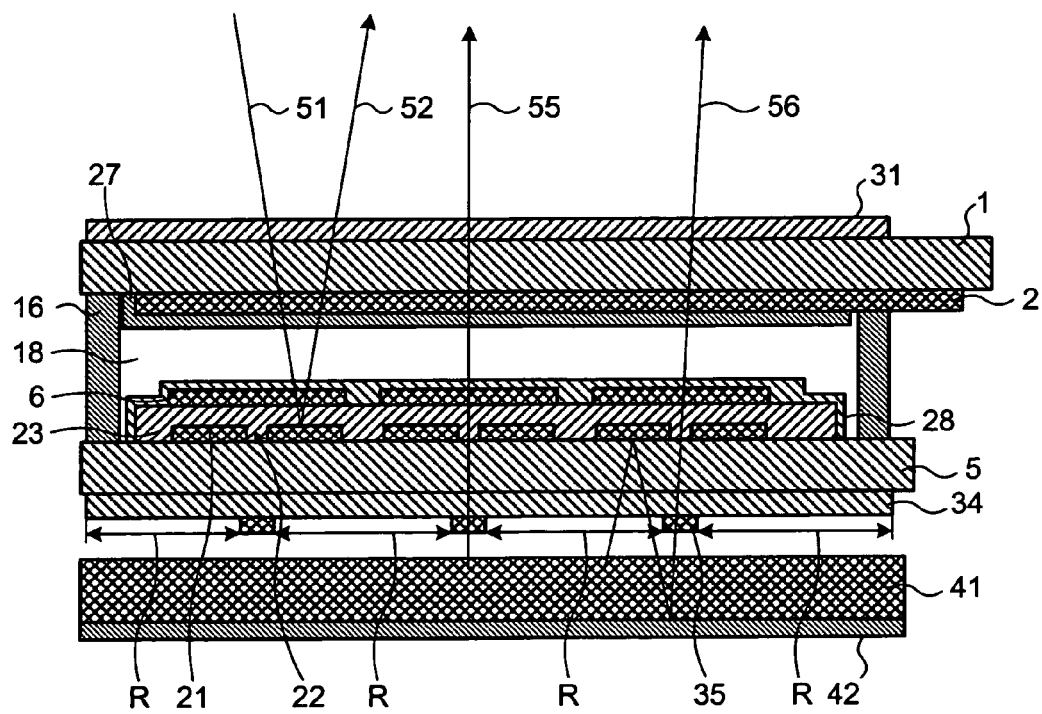
FIG. 2 is a cross-section of the liquid crystal display unit.

FIG. 1 is a top plan view of a liquid crystal display unit according to a first embodiment. FIG. 2 is a cross-section of the liquid crystal display unit along a cut line A-A shown in FIG. 1. As shown in FIGS. 1 and 2, the first substrate 1 and the second substrate 5 are adhered to each other by the sealing member 16, with a predetermined gap formed therebetween. A space surrounded by the first substrate 1, the second substrate 5, and the sealing member 16, is sealed with a sealer 17, including the liquid crystal layer 18 inserted therein.

The first electrode 2 is formed on the surface of the first substrate 1 facing the liquid crystal layer. The surface of the first electrode 2 is covered with the orientation film 27. The upper polarizing film 31 is provided on the surface of the first substrate 1 opposite to the liquid crystal layer 18. The reflection film 21 is provided on the surface of the second substrate 5 facing the liquid crystal layer. The reflection film 21 is provided with the reflector and the aperture 22 having a larger light transmission factor than that of the reflector. The reflection film 21 (including the aperture 22) is covered with the insulation film 23. The second electrode 6 is formed on the surface of the insulation film 23. The surfaces of the insulation film 23 and the second electrode 6 are covered with the orientation film 28.

The retardation film 34 is provided on the whole surface of the display area on the surface of the second substrate 5 opposite to the liquid crystal layer 18. A partial polarization member 35 is partially provided on the surface of the retardation film 34, that is, on the surface opposite to the liquid crystal layer 18. The partial polarization member 35 is provided in the area that spatially overlaps with the aperture 22 of the reflection film 21. The partial polarization member 35 is not provided in the area that spatially overlaps with the reflector of the reflection film 21 (an area R indicated by a line of double arrowheads shown in FIG. 2).

A backlight unit having the backlight 41 as an auxiliary light source and the backlight reflection film 42 as a reflection member is provided at a lower side of the partial polarization member 35. The backlight 41 includes one or plural laminated sheets having a prism surface, a diffusion sheet, and an optical waveguide, from the second substrate 5 side. The light that is reflected from the reflector of the reflection film 21 to the backlight 41 is scattered at a predetermined angle by the diffusion sheet, thereby outputting the light from the backlight 41 to a predetermined area.

A diffusion member can be provided between the backlight 41 and the backlight reflection film 42. Alternatively, a diffusive reflection member, for example, a functional member having an uneven surface on which a reflection film is formed, can be used for the backlight reflection film 42. In this case, optical diffusion between the backlight 41 and the liquid crystal display element is not important. Therefore, the backlight 41 can be specifically designed to match the brightness of the transmission display. The backlight unit can have a configuration using an optical waveguide and a light source, or an organic electroluminescent (EL) light source can be used for the backlight unit. The organic EL light source has an advantage in that it is thin and flat, and that only a part can be displayed by pattern forming an electrode.

Detailed configurations and methods of manufacturing the partial polarization member 35 are explained next. For example, as a method of manufacturing the partial polarization member 35, a TCF (thin crystal films) product of Optiva, Inc. is used. A polarization layer is formed on the whole surface of the retardation film 34. The polarization layer is removed by etching, except the part corresponding to the aperture 22 of the reflection film 21. Alternatively, the TCF product can be pattern printed on the surface of the retardation film 34.

The partial polarization member 35 can be configured with a polarizing polymer film. The polarizing polymer film is a film obtained by generating a molecular film using a water-soluble lyotropic liquid crystal dye material or a liquid crystal material using a thermotropic polymer liquid crystal as a main component. Alternatively, iodine is contained in a polymer film, and this polymer film is extended in one direction, and thereafter, is transferred onto the surface of the retardation film 34.

Figure 3:
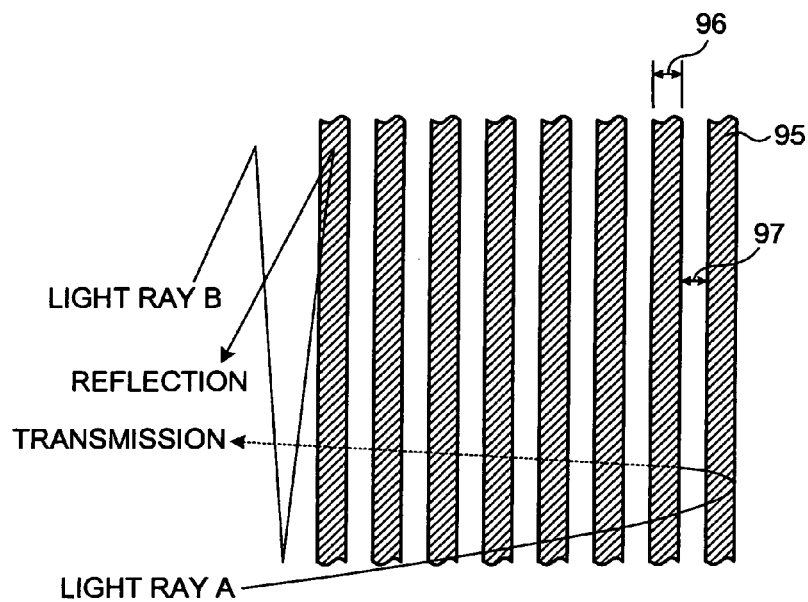
FIG. 3 is a top plan view of a grid polarization member.

A grid polarization member as shown in FIG. 3 can be used for the partial polarization member 35. In this case, an electric conductor thin film of aluminum or silver, or an alloy of these metals and other metal, is formed on the whole surface of the retardation film 34. This thin film is etched to form slits 95 of thin conductors in the area corresponding to the aperture 22 of the reflection film 21. The retardation film 34 is exposed at a part where the conductive thin film is removed (the part other than the slits 95). Therefore, a grid polarization member having a conductor and an insulator provided repeatedly is obtained. Although not particularly limited, 150 to 250 nanometers is suitable for a slit width 96. A suitable size of a gap 97 between the slits is 50 to 100 nanometers.

The light from the auxiliary light source is a circular polarized light or an oval polarized light. To simplify the explanation, in FIG. 3, the light of a polarization component orthogonal with the slit 95 is denoted by a light ray A. The light of a polarization component parallel with the slit 95 is dented by a light ray B. The light ray A passes through a gap between the slits 95, and becomes a straight line polarized light. The light ray B is reflected from the slit 95. Therefore, the light of the orthogonally polarized component that is orthogonal with the slit 95 can be extracted from the light that is output from the auxiliary light source. Consequently, approximately a half of the light that is output from the auxiliary light source is reflected to the backlight, which enables more effective use of the light.

An adhesive material is printed on only a part of the retardation film 34 that corresponds to the aperture 22 of the reflection film 21. A commercially available film polarizing film can be mounted on this adhesive material, and the polarizing film is die-cut, thereby disposing the partial polarization member 35. In this case, a reflection polarizing film can be used for the polarizing film. When the reflection polarizing film is used, one polarization axis is a transmission polarization axis, like the grid polarization member made of the fine slits 95. The polarization axis substantially orthogonal with this transmission polarization axis is a reflection polarization axis. Therefore, the light from the reflection polarization axis is output to the backlight unit efficiently.

The operation of the liquid crystal display unit according to the first embodiment is explained next. When the external environment is bright, the reflector of the reflection film 21 is used. That is, the incident light 51 passes through the upper polarizing film 31 and the liquid crystal layer 18, and reaches the reflector of the reflection film 21. The light is reflected from the reflector, and passes again through the liquid crystal layer 18 and the upper polarizing film 31. The light is output to the observer side as the reflection light 52 due to the optical characteristics of the upper polarizing film 31 and the liquid crystal layer 18. Display is performed by utilizing large and small reflection intensity at the reflector of the reflection film 21.

When the external environment is dark, the partial polarization member 35, the liquid crystal layer 18, and the upper polarizing film 31 optically modulate the light emitted from the backlight 41, thereby performing display. The partial polarization member 35 polarizes the first transmission light-flux 55 emitted from the backlight 41. The retardation film 34 phase modulates the polarized light. The modulated light is directly incident to the aperture 22 of the reflection film 21, and is optically modulated by the liquid crystal layer 18. The light then passes through the upper polarizing film 31, and is output to the observer side.

The second transmission light-flux 56 emitted from the backlight 41 passes through the retardation film 34, and reaches the reflector of the reflection film 21, without passing through the partial polarization member 35. The light reflected from the reflector of the reflection film 21 returns to the backlight 41, without being substantially absorbed. This reflection light passes through the area R where there is no partial polarization member 35, and is therefore incident to the backlight 41, without being substantially absorbed. The light that is incident to the backlight 41 is reflected from the backlight reflection film 42, and is output again from the backlight 41.

The light emitted from the backlight 41 again is incident to the partial polarization member 35. The light passes through the aperture 22 of the reflection film 21, and is output to the observer side as the second transmission light-flux 56. Thus, while repeating reflections between the reflector of the reflection film 21 and the backlight reflection film 42, the light incident to the partial polarization member 35 is output to the observer side, thereby efficiently outputting the light. Therefore, according to the first embodiment, the light emitted from the backlight 41 is output to the observer side with improved efficiency, thereby realizing bright transmission display.

Since bright transmission display is realized, the aperture 22 of the reflection film 21 through which the transmission light-fluxes 55 and 56 pass can be made small, thereby realizing bright reflection display. Since the reflection display is bright, the time in which the backlight 41 is lit can be reduced. Therefore, power consumed by the backlight 41 can be reduced. Visibility of the transmission display is satisfactory even when the light amount of the backlight 41 is reduced. Therefore, power consumed by the backlight 41 can be reduced.

Since the partial polarization member 35 is provided at the outside of the second substrate 5, an electrode and a color filter do not need to be prepared on the partial polarization member 35. Therefore, the material of the partial polarization member 35 is not specifically limited, which facilitates manufacturing of the partial polarization member 35. For example, when a film-shaped material is used for the partial polarization member 35, the partial polarization member 35 can be formed easily as described above. However, since the partial polarization member 35 is slightly separated from the liquid crystal layer 18, light is easily leaked out. Therefore, preferably, the partial polarization member 35 is formed slightly larger than the aperture 22 of the reflection film 21.

Figure 4:
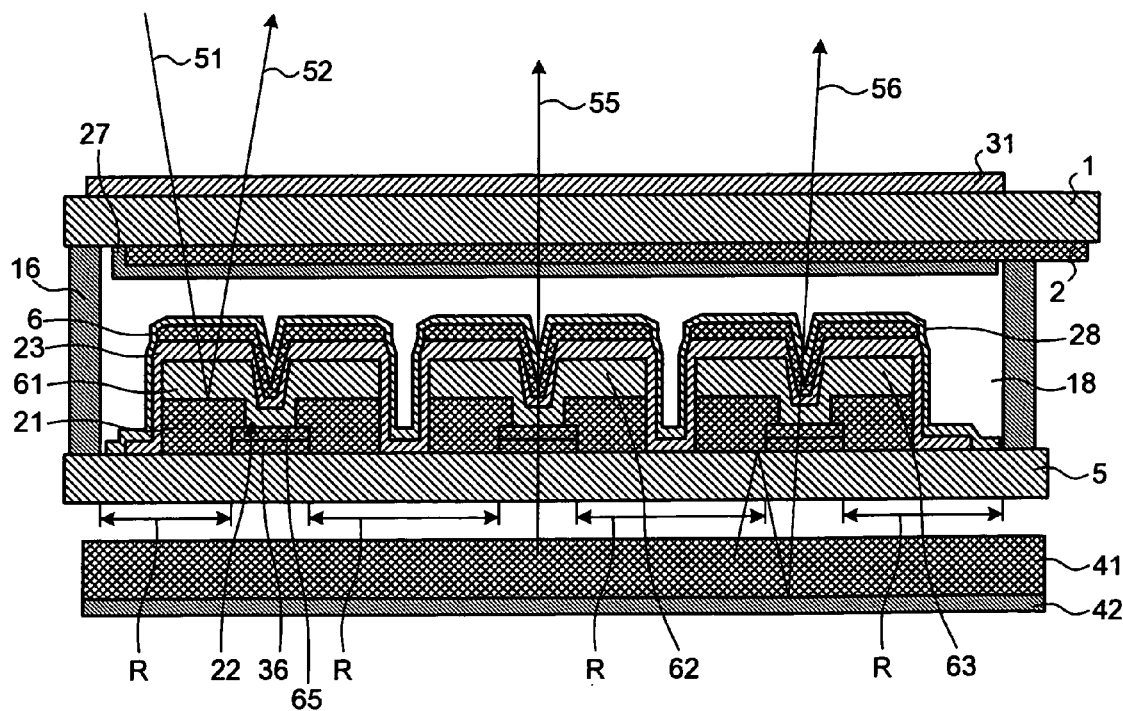
FIG. 4 is a cross-section of a liquid crystal display unit according to a second embodiment.

FIG. 4 is a cross-section of a liquid crystal display unit according to a second embodiment along the cut line A-A shown in FIG. 1. According to the second embodiment, instead of the partial polarization member 35 according to the first embodiment, an embedded partial polarization member 36 is provided on the surface of the second substrate 5 facing the liquid crystal layer. The partial polarization member 36 is provided in the area where the partial polarization member 36 spatially overlaps with the aperture 22 of the reflection film 21. The partial polarization member 36 is not provided in the area that spatially overlaps with the reflector of the reflection film 21 (the area R indicated by a line of double arrowheads shown in FIG. 4).

First color filters 61, 62, and 63, and a second color filter 65 are provided. The second color filter 65 is laminated on the surface of the partial polarization member 36. That is, the second color filter 65 is provided in only an area that spatially overlaps with the aperture 22 of the reflection film 21. Preferably, the external shape of the second color filter 65 is the same as that of the partial polarization member 36. This is because in the manufacturing process, by etching the second color filter 65 and the partial polarization member 36 using the same mask, the second color filter 65 and the partial polarization member 36 can be formed at the same time. Therefore, the manufacturing process can be simplified, and the manufacturing cost can be reduced.

The first color filters 61, 62, and 63 are laminated on the surface of the reflector of the reflection film 21 and the surface of the second color filter 65. That is, the first color filters 61, 62, and 63 are provided in one layer on the reflector of the reflection film 21. On the other hand, the first color filters 61, 62, and 63 and the second color filter 65 are laminated in two layers on the aperture 22 of the reflection film 21.

For the reflection display, the incident light 51 passes through the first color filters 61, 62, and 63 twice until the light is output to the observer side after being reflected from the reflector of the reflection film 21. Therefore, bright and easily viewable display can be realized. On the other hand, for the transmission display, if the second color filter 65 is not present, the transmission light-fluxes 55 and 56 from the auxiliary light source pass through the first color filters 61, 62, and 63 only once. Therefore, sufficient chroma cannot be realized. In order to avoid this inconvenience, the second color filter 65 is provided.

In other words, transmission display of sufficient chroma can be realized, when the transmission light-fluxes 55 and 56 from the auxiliary light source pass through the second color filter 65 and the first color filters 61, 62, and 63. The color purity of the second color filter 65 is improved from that of the color filters at other parts. The reflection film 21, the first color filters 61, 62, and 63, and the second color filter 65 are covered with the insulation film 23. The thickness of the insulation film 23 on the reflector of the reflection film 21 is different from that of the insulation film 23 on the aperture 22.

Although not particularly limited, for the light having a wavelength $\lambda$ of 530 nanometers, the thickness of the liquid crystal layer 18 is set to 2.2 micrometers so that $\Delta nd$ becomes $\lambda/4$ (132.5 nanometers), in the area corresponding to the reflector of the reflection film 21. The thickness of the liquid crystal layer 18 is set to 4.4 micrometers so that $\Delta nd$ becomes $\lambda/2$ (265 nanometers), in the area corresponding to the aperture 22 of the reflection film 21. With this arrangement, even if a retardation film is not provided between the liquid crystal layer 18 and the partial polarization member 36, a contras ratio of the transmission display can be made satisfactory. Further, the color of the white display also becomes satisfactory. A contrast ratio of the reflection display also becomes satisfactory. Therefore, according to the second embodiment, a retardation film is not provided on the surface of the second substrate 5 opposite to the liquid crystal layer 18. Other configurations are similar to those according to the first embodiment.

The operation of the liquid crystal display unit according to the second embodiment is explained next. When the external environment is bright, the reflector of the reflection film 21 is used, like in the first embodiment. The incident light 51 is output to the observer side as the reflection light 52 due to the optical characteristics of the upper polarizing film 31 and the liquid crystal layer 18. When the external environment is dark, the partial polarization member 36, the liquid crystal layer 18, and the upper polarizing film 31 optically modulate the light emitted from the backlight 41, thereby performing display. The first transmission light-flux 55 emitted from the backlight 41 is directly incident to the partial polarization member 36, and is optically modulated by the liquid crystal layer 18. The light then passes through the upper polarizing film 31, and is output to the observer side.

Of the second transmission light-flux 56 emitted from the backlight 41, the light that passes through the area R in which the partial polarization member 36 is not present reaches the reflector of the reflection film 21. The light reflected from the reflector of the reflection film 21 returns to the backlight 41, without being substantially absorbed. This reflection light is incident to the backlight 41 without being substantially absorbed, because the light does not pass through the partial polarization member 36. The light incident to the backlight 41 is reflected from the backlight reflection film 42, and is output again from the backlight 41.

Of the light emitted from the backlight 41 again, the light that is incident to the partial polarization member 36 passes through the aperture 22 of the reflection film 21, and is output to the observer side as the second transmission light-flux 56. In this way, while repeating reflections between the reflector of the reflection film 21 and the backlight reflection film 42, the light incident to the partial polarization member 36 is output to the observer side, thereby efficiently outputting the light. Therefore, according to the second embodiment, the light emitted from the backlight 41 is output to the observer side with improved efficiency.

Since the distance from the partial polarization member 36 to the liquid crystal layer 18 is smaller than that according to the first embodiment, less light leaks out to the partial polarization member 36. Therefore, the partial polarization member 36 can be made small. However, the reflection film 21, and the color filters 61, 62, 63, and 65 need to be prepared on the partial polarization member 36. Consequently, in selecting a material of the partial polarization member 36, heat resistance and chemical resistance need to be taken into account at the process of preparing the reflection film 21, and the color filters 61, 62, 63, and 65.

Since the light that does not pass through the partial polarization member 36 can be prevented from being output to the observer side, the contrast of the transmission display can be improved. Further, since the transmission light-fluxes 55 and 56 pass through the first color filters 61, 62, and 63, and the second color filter 65, the color purity of the transmission display can be improved. Since only the first color filters 61, 62, and 63 are provided on the reflector of the reflection film 21, a reduction in the brightness at the reflection display time can be prevented. Further, the second color filter 65 prevents the partial polarization member 36 from being degraded.

Figure 5:
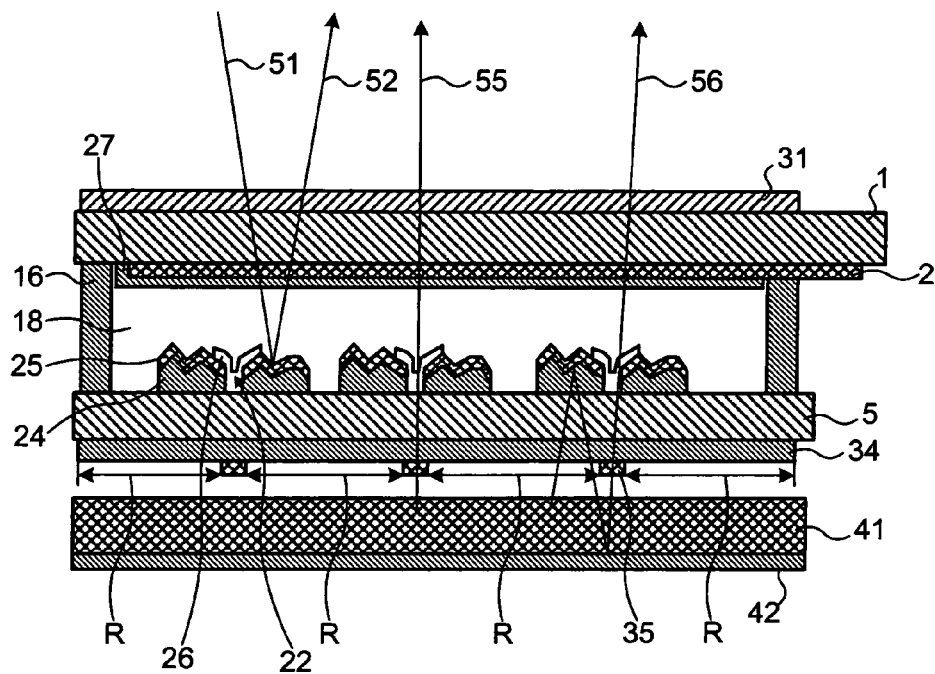
FIG. 5 is a cross-section of a liquid crystal display unit according to a third embodiment.

FIG. 5 is a cross-section of a liquid crystal display unit according to a third embodiment along the cut line A-A shown in FIG. 1. According to the third embodiment, instead of the insulation film 23, the reflection film 21, and the second electrode 6 according to the first embodiment, an insulation film 24, a reflection film 25, and a transmission lower electrode 26, each having an uneven surface and an aperture, are provided. The reflection film 25 has a reflector having an uneven surface, which is provided on the insulation film 24. The transmission lower electrode 26 includes, for example, an indium tin oxide (ITO) film as a second electrode.

The aperture of the insulation film 24 is provided at the same position as that of the aperture 22 of the reflection film 25. The transmission lower electrode 26 is formed to cover the aperture 22 of the reflection film 25, and is electrically connected to the reflection film 25. Other configurations are the same as those according to the first embodiment. In FIG. 5, an orientation film that covers the insulation film 24, the reflection film 25, and the transmission lower electrode 26 is omitted (the orientation film is also omitted in FIG. 6 to FIG. 13).

According to the third embodiment, since the reflector of the reflection film 25 has an uneven surface, the light emitted from the backlight 41 is easily reflected to the position of the aperture 22 of the reflection film 25. The light emitted from the backlight 41 can be reflected from the reflector of the reflection film 25 as reflection lights of various angles, and output to the backlight 41 side. Therefore, brighter reflection display can be realized, and the brightness of the transmission display can be significantly improved.

Figure 6:
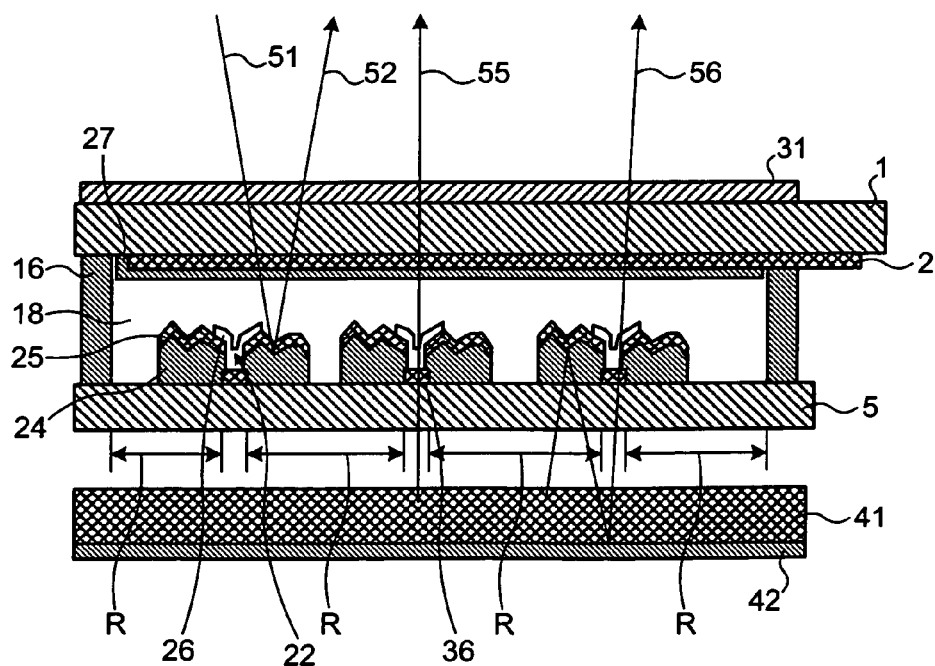
FIG. 6 is a cross-section of a liquid crystal display unit according to a fourth embodiment.

FIG. 6 is a cross-section of a liquid crystal display unit according to a fourth embodiment, which is cut along the cut line A-A shown in FIG. 1. According to the fourth embodiment, instead of the partial polarization member 35 according to the third embodiment, the embedded partial polarization member 36 similar to that according to the second embodiment is provided on the surface of the second substrate 5 facing the liquid crystal layer. The partial polarization member 36 is provided in the area that spatially overlaps with the aperture 22 of the reflection film 25.

The partial polarization member 36 is not provided in the area that spatially overlaps with the reflector of the reflection film 25 (the area R indicated by a line of double arrowheads shown in FIG. 6). According to the fourth embodiment, a retardation film is not provided on the surface of the second substrate 5 opposite to the liquid crystal layer 18. Other configurations are similar to those according to the third embodiment.

According to the fourth embodiment, like in the third embodiment, brighter reflection display can be realized, and brightness of the transmission display can be significantly improved. The distance between the partial polarization member 36 and the liquid crystal layer 18 becomes short, because the partial polarization member 36 is provided at the liquid crystal layer side. Therefore, less light leaks out to the partial polarization member 36, and the partial polarization member 36 can be made small. Since the light that does not pass through the partial polarization member 36 can be prevented from being output to the observer side, the contrast of the transmission display can be improved.

Figure 7:
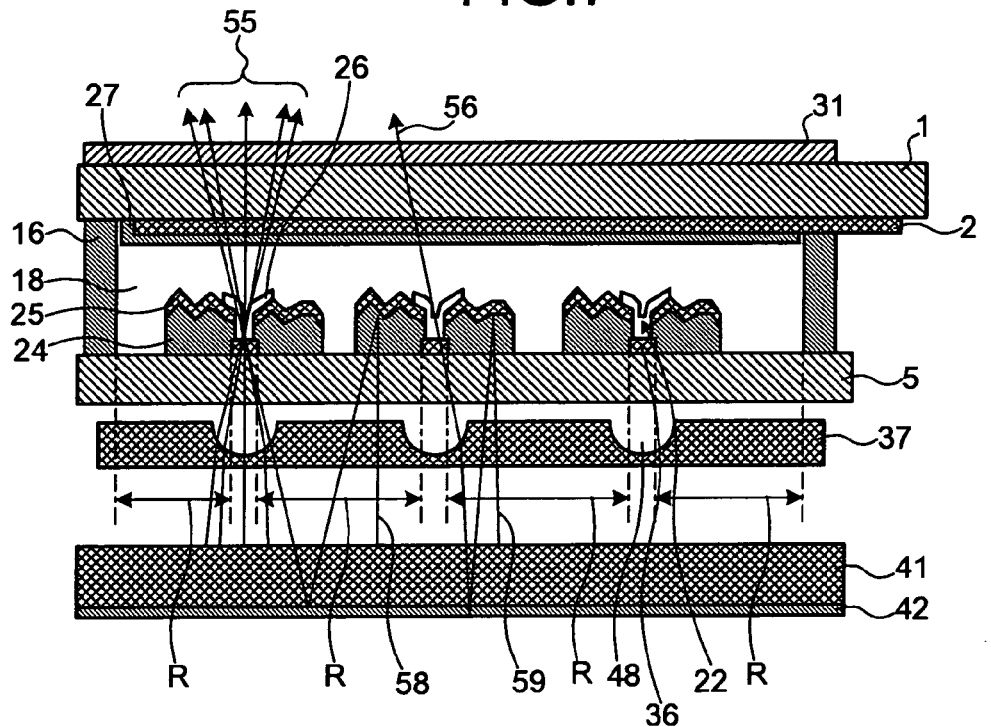
FIG. 7 is a cross-section of a liquid crystal display unit according to a fifth embodiment.

FIG. 7 is a cross-section of a liquid crystal display unit according to a fifth embodiment along the cut line A-A shown in FIG. 1. According to the fifth embodiment, an optical member 37 having a domed recess 48 is provided between the second substrate 5 and the backlight 41, in the fourth embodiment, such that the recess 48 is opened to the observer side, that is, the second substrate 5. The optical member 37 is provided such that the recess 48 spatially overlaps with the aperture 22 of the reflection film 25. Other configurations are similar to those according to the fourth embodiment.

The second substrate 5 and the optical member 37 can be separated as shown in FIG. 7, or can be adhered to each other. Particularly, when the flat part excluding the recess 48 of the optical member 37 is adhered to the second substrate 5, the light that is emitted from the backlight 41 and is reflected from the reflector of the reflection film 25 can be effectively returned to the backlight 41, which is preferable. While the optical member 37 is separated from the backlight 41 in the example shown in the drawing, these can be adhered to each other.

According to the fifth embodiment, the first transmission light-flux 55 that is emitted from the backlight 41 and passes through the recess 48 of the optical member 37 is condensed to the aperture 22 of the reflection film 25 by the recess 48. The light then passes through the aperture 22 and is output to the observer side. The lights 58 and 59 that are emitted from the backlight 41, do not pass through the recess 48 of the optical member 37, and are not condensed accordingly, are reflected from the reflector of the reflection film 25. The light reflected from the reflector of the reflection film 25 returns to the backlight 41, is reflected from the backlight 41 or the backlight reflection film 42, and is output again from the backlight 41.

Of the light emitted again from the backlight 41, the light that passes through the recess 48 of the optical member 37 is condensed, passes through the aperture 22 of the reflection film 25, and is output to the observer side as the second transmission light-flux 56. In this way, while repeating reflections between the reflector of the reflection film 25 and the backlight reflection film 42, the light incident to the recess 48 of the optical member 37 is condensed and is output to the observer side, thereby extremely efficiently outputting the light. Therefore, according to the fifth embodiment, the light emitted from the backlight 41 can be extremely effectively utilized, thereby realizing bright transmission display.

Figure 8:
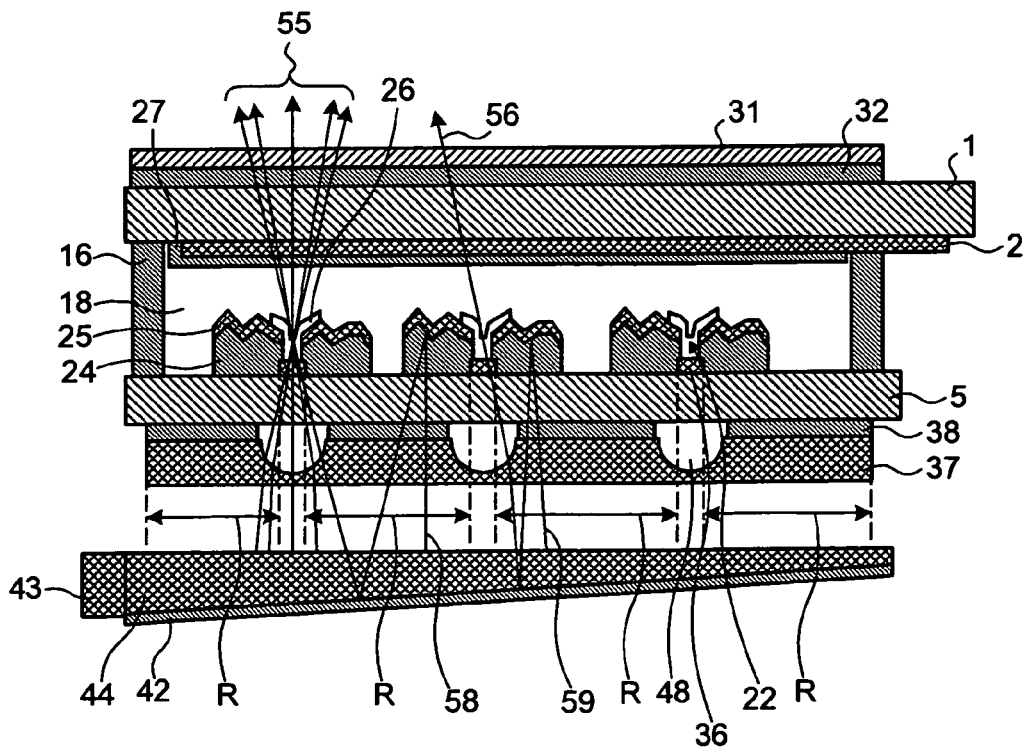
FIG. 8 is a cross-section of a liquid crystal display unit according to a sixth embodiment.

FIG. 8 is a cross-section of a liquid crystal display unit according to a sixth embodiment along the cut line A-A shown in FIG. 1. According to the sixth embodiment, instead of the backlight unit including the backlight 41 and the backlight reflection film 42 according to the fifth embodiment, a backlight unit including a light source 43 made of a light-emitting diode (LED) element, an optical waveguide 44, and the backlight reflection film 42 is provided. The optical waveguide 44 is provided to face substantially the whole surface of the second substrate 5. The light source 43 is provided along a part of the periphery of the optical waveguide 44.

A flat part excluding the recess 48 of the optical member 37 is adhered to the second substrate 5 with an adhesive material 38 made of a transparent acrylic resin. With this arrangement, the light that is emitted from the backlight unit and is reflected from the reflector of the reflection film 25 can be effectively returned to the backlight unit. A retardation film 32 is provided between the upper polarizing film 31 and the first substrate 1.

Although not particularly shown, two prism sheets each having a prism uneven surface are superimposed orthogonally with the grooves of the prisms, from the optical member 37 side, between the optical waveguide 44 and the optical member 37. The prism surfaces are faced to the second substrate 5. With this arrangement, the angle of the light incident from the backlight unit to the optical member 37 is limited, thereby improving the efficiency of collecting light to the aperture 22 of the reflection film 25 by the optical member 37.

According to the sixth embodiment, the prism sheets and the recess 48 of the optical member 37 keep the angular dependence of the light. Therefore, particularly large diffusion is not necessary. However the first substrate 1 and the retardation film 32 are adhered to each other with a diffusion bond that becomes a diffusion layer. Alternatively, the upper polarizing film 31 and the retardation film 32 can be adhered to each other with the diffusion bond. Other configurations are similar to those according to the fifth embodiment.

Figure 9:
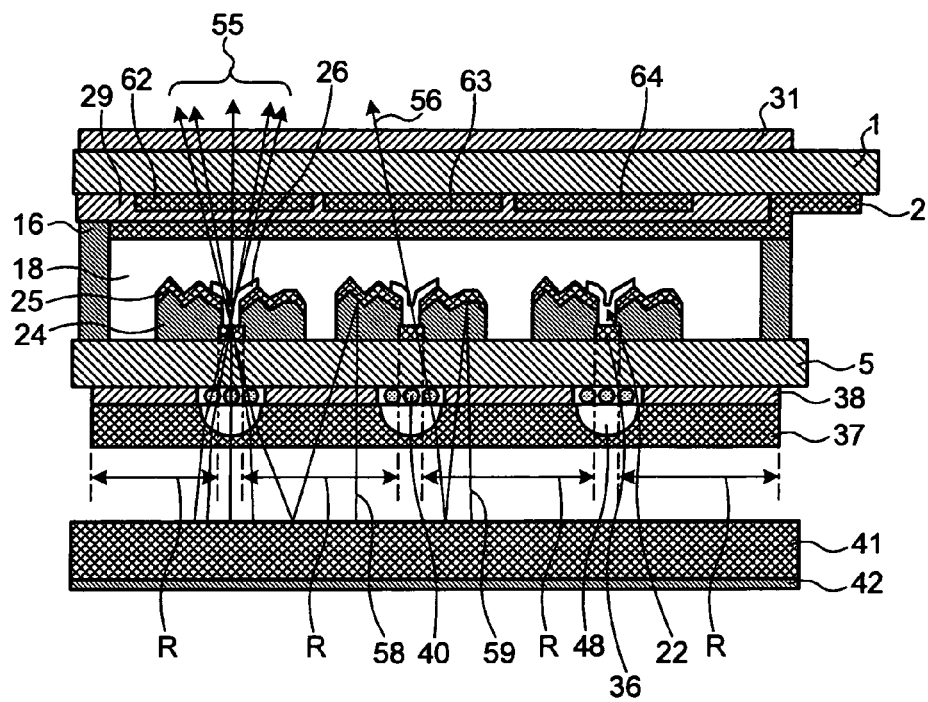
FIG. 9 is a cross-section of a liquid crystal display unit according to a seventh embodiment.

FIG. 9 is a cross-section of a liquid crystal display unit according to a seventh embodiment along the cut line A-A shown in FIG. 1. According to the seventh embodiment, the optical member 37 is adhered to the second substrate 5 with the adhesive material 38 made of a transparent resin such as a transparent acrylic resin in the fifth embodiment. The area of the adhesive material 38 that overlaps with the recess 48 of the optical member 37 is mixed with a diffusion member 40 to form a diffusion layer. This diffusion member 40 is provided to slightly diffuse the light that passes through the recess 48 of the optical member 37 and output the light to the embedded partial polarization member 36.

The optical member 37 is adhered to the second substrate 5 via the adhesive material 38 having partial diffusion as follows. For example, a transparent acrylic resin is mixed with a plastic ball made of styrene or the like having a refraction factor different from that of the transparent acrylic resin. This mixture is printed onto an area of the bonded surface of the second substrate 5 that spatially overlaps with the partial polarization member 36, that is, an area that faces the recess 48 of the optical member 37. Then, a transparent acrylic resin not mixed with the plastic ball is printed in dots in the area other than the area where the mixture of the transparent acrylic resin and the plastic ball is printed. The optical member 37 is pressure bonded to the printed surface.

Color filters 62, 63, and 64 of red, green, and blue respectively are provided on the surface of the first substrate 1 facing the liquid crystal layer. These color filters 62, 63, and 64 are covered with an insulation film 29, thereby embedding gaps between the adjacent color filters 62, 63, and 64 with the insulation film 29. As a result, steps generated due to presence or absence of the color filters 62, 63, and 64 are eliminated. Therefore, the insulation film 29 has a flat surface. The color filters 62, 63, and 64 can also be prevented from being degraded.

The first electrode 2 is made of an indium tin oxide (ITO) film as a transparent electric conductive film, and is formed in a stripe on the surface of the flattened insulation film 29. At least one of the reflection film 25 and the transmission lower electrode 26 is a striped electrode of which stripe is orthogonal with the first electrode 2. An intersection between the reflection film 25 or the striped electrode of the transparent lower electrode 26 and the striped electrode of the first electrode 2 forms a pixel. These pixels form a matrix liquid crystal display element. Other configurations are similar to those according to the fifth embodiment. In FIG. 9, the orientation film that covers the first electrode 2 is omitted (the orientation film is also omitted in FIG. 10 to FIG. 13).

According to the seventh embodiment, the flat part of the optical member 37 and the second substrate 5 are adhered to each other with the adhesive material 38. Therefore, the light emitted from the backlight 41 and reflected from the reflector of the reflection film 25 can be effectively returned to the backlight 41. The second substrate 5 is thin, and a mixture ratio of a transparent acrylic resin to the diffusion member 40 in the adhesive material 38 is set higher than the mixture ratio using an acrylic resin. Therefore, the transmission display becomes bright, and dependency on the angle of view of the display is not a problem. Consequently, satisfactory display can be realized.

Instead of forming the adhesive material 38 at different stages for two parts of the flat area of the optical member 37 and the area of the recess 48, a transparent film having a diffusion area and a non-diffusion area can be used. In this case, one surface of the transparent film is adhered to the second substrate 5 using a thin-film adhesive material, and the other surface of the transparent film is adhered to the optical member 37 using the thin-film adhesive material.

Figure 10:
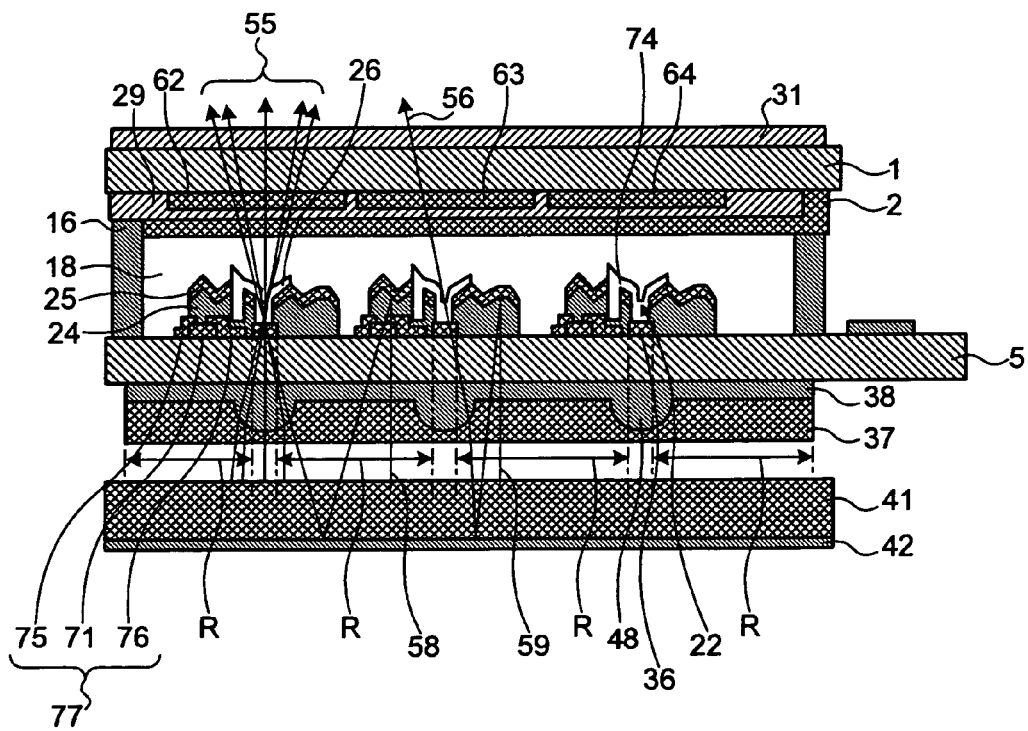
FIG. 10 is a cross-section of a liquid crystal display unit according to an eighth embodiment.

FIG. 10 is a cross-section of a liquid crystal display unit according to an eighth embodiment along the cut line A-A shown in FIG. 1. According to the eighth embodiment, a switching element including a three-terminal thin-film transistor (TFT) 77 is provided on the surface of the second substrate 5 facing the liquid crystal layer for each pixel in the seventh embodiment. That is, the liquid crystal display unit according to the eighth embodiment is an active matrix type unit. The optical member 37 and the second substrate 5 are adhered to each other on the whole surface with the adhesive material 38 made of a transparent resin, thereby forming an integrated unit. The adhesive material 38 is not mixed with the diffusion member 40.

The TFT 77 is provided in the area that spatially overlaps with the reflector of the reflection film 25, that is, right beneath the reflector of the reflection film 25 as seen from the observer side. Therefore, the TFT 77 is not visible from the observer side. The TFT 77 includes a gate electrode (not shown) formed on the surface of the second substrate 5 facing the liquid crystal layer, a gate insulation film (not shown)

formed on the surface of the gate electrode, a semiconductor layer 71 made of an amorphous silicon (a-Si) film, a source electrode 75, and a drain electrode 76.

The drain electrode 76 is covered with the insulation film 24 provided between the second substrate 5 and the reflection film 25. The drain electrode 76 is electrically connected to the transmission lower electrode 26 via a contact hole 74 that pierces through the insulation film 24. At the time of driving the liquid crystal, a predetermined signal is applied to the gate electrode and the source electrode 75 of the TFT 77. When a signal is applied to between the reflection film 25, the transmission lower electrode 26, and the first electrode 2, a voltage is applied to the liquid crystal layer 18. Therefore, an optical change is controlled, and desired display is performed. Other configurations are similar to those according to the seventh embodiment. A two-terminal thin-film diode (TFT) can be used for the switching element.

Figure 11:
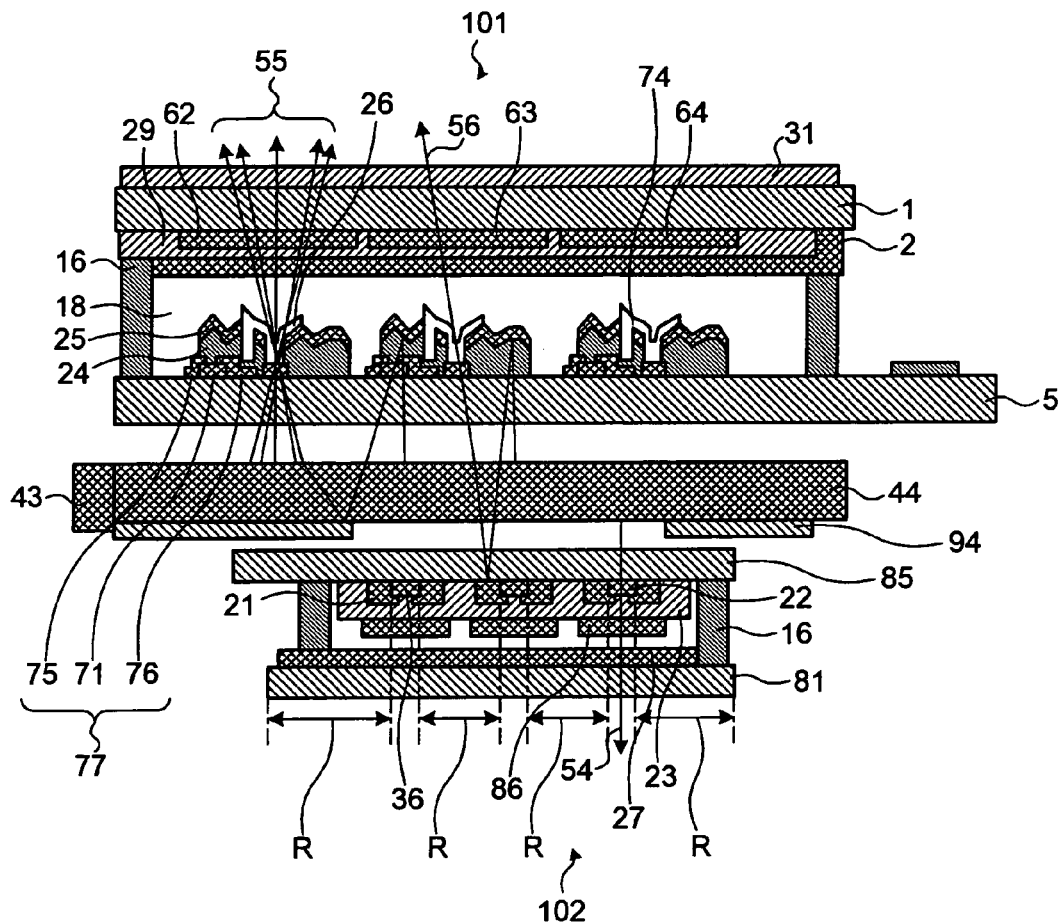
FIG. 11 is a cross-section of a liquid crystal display unit according to a ninth embodiment.

FIG. 11 is a cross-section of a liquid crystal display unit according to a ninth embodiment along the cut line A-A shown in FIG. 1. According to the ninth embodiment, an active matrix first liquid crystal display element 101 having a switching element and a passive matrix second liquid crystal display element 102 are provided to sandwich a single backlight unit for each pixel. That is, the first liquid crystal display element 101 and the second liquid crystal display element 102 share the backlight unit. Each of the first liquid crystal display element 101 and the second liquid crystal display element 102 has the embedded partial polarization member 36.

The first liquid crystal display element 101 has a configuration substantially similar to that of the liquid crystal display unit excluding the backlight unit according to the eighth embodiment, for example. However, the first liquid crystal display element 101 is not provided with the optical member 37 between the second substrate 5 and the backlight unit. Other configurations of the first liquid crystal display element 101 are similar to those of the liquid crystal display unit according to the eighth embodiment.

The second liquid crystal display element 102 has a configuration substantially similar to that of the liquid crystal display unit excluding the backlight unit according to the second embodiment, for example. However, the second liquid crystal display element 102 is not provided with the first color filters 61, 62, and 63, and the second color filter 65. According to the second liquid crystal display element 102, the insulation film 23 has a flat surface that covers the reflector and the aperture 22 of the reflection film 21. Other configurations of the second liquid crystal display element 102 are similar to those of the liquid crystal display unit according to the second embodiment.

To simplify the explanation, the first substrate 1, the second substrate 5, the first electrode 2, and the second electrode 6 of the liquid crystal display unit according to the second embodiment are referred to as a third substrate 81, a fourth substrate 85, a third electrode (omitted in FIG. 9), and a fourth electrode 86 respectively, for the second liquid crystal display element 102. A unit including the light source 43 and the optical waveguide 44 similar to that according to the sixth embodiment is used for the backlight unit.

The second liquid crystal display element 102 has the fourth substrate 85 provided at the backlight unit side. The first liquid crystal display element 101 has the second substrate 5 provided at the backlight unit side. That is, the first liquid crystal display element 101 and the second liquid crystal display element 102 are provided such that the second substrate 5 faces the surface of the optical waveguide 44 of the backlight unit and that the fourth substrate 85 faces the back surface of the optical waveguide 44 of the backlight unit. In order to make the light emitted from the optical waveguide 44 incident to both directions of the first liquid crystal display element 101 and the second liquid crystal display element 102, a backlight reflection film is not provided on either the front surface or the back surface of the optical waveguide 44.

According to the ninth embodiment, the reflector of the reflection film 25 of the first liquid crystal display element 101 functions as a backlight reflection film to make reflection to the second liquid crystal display element 102. Similarly, the reflector of the reflection film 21 of the second liquid crystal display element 102 functions as a backlight reflection film to make reflection to the first liquid crystal display element 101. Although not particularly limited, in the example shown in FIG. 11, the reflection film 21 of the second liquid crystal display element 102 is valid as the backlight reflection film for only a part of the display area of the first liquid crystal display element 101, because the display area of the second liquid crystal display element 102 is smaller than the display area of the first liquid crystal display element 101.

In order to compensate for a shortage of reflection, a reflection film 94 is provided on a part of the back surface of the optical waveguide 44 (the surface facing the second liquid crystal display element 102). The reflection film 94 is provided in the area where the reflection film 21 of the second liquid crystal display element 102 is not provided, that is the area corresponding to the outer periphery of the display area of the first liquid crystal display element 101. A printed layer (not shown) that limits a reflection coefficient using an area ratio of the reflector of the reflection film 21 to the aperture 22 of the second liquid crystal display element 102 is provided on the reflection film 94. The reflection coefficient in the display area of the second liquid crystal display element 102 is the same as the reflection coefficient on the reflection film 94. With this arrangement, uniform light is incident from the second liquid crystal display element 102 to the first liquid crystal display element 101.

There is a difference corresponding to a thickness of the fourth substrate 85 of the second liquid crystal display element 102, between the reflection film 94 and the reflection film 21 of the second liquid crystal display element 102. Therefore, the reflection film 94 extends to a disposition position of the reflection film 21 of the second liquid crystal display element 102, and the edge of the reflection film 94 spatially overlaps with the edge of the reflection film 21. Consequentially, the fourth substrate 85 is preferably thin. For example, glass having a thickness of 0.3 millimeter is used for the fourth substrate 85. To avoid complexity, the orientation film that covers the insulation film 23 and the fourth electrode 86 of the second liquid crystal display element 102 is not shown in FIG. 11.

According to the ninth embodiment, a part of the light emitted from the front surface of the optical waveguide 44 passes through the aperture of the reflection film 25 of the first liquid crystal display element 101, and is output as the first transmission light-flux 55 to the side of the observer who observes the first liquid crystal display element 101. The rest of the light emitted from the front surface of the optical waveguide 44 is reflected from the reflector of the reflection film 25 of the first liquid crystal display element 101, and returns to the optical waveguide 44. A part of the light returned to the optical waveguide 44 is reflected from the reflection film 94, passes through the optical waveguide 44, and is incident to the first liquid crystal display element 101. The rest of the light returned to the optical waveguide 44 passes through the optical waveguide 44, and is incident to the second liquid crystal display element 102.

A part of the light incident to the second liquid crystal display element 102 passes through the aperture 22 of the reflection film 21 of the second liquid crystal display element 102, and is output to the side of the observer who observes the second liquid crystal display element 102. The rest of the light incident to the second liquid crystal display element 102 is reflected from the reflector of the reflection film 21 of the second liquid crystal display element 102, and returns to the optical waveguide 44 again. The light passes through the optical waveguide 44, and is incident to the first liquid crystal display element 101.

Of the light that is reflected from the reflection film 94 or the reflection film 21 of the second liquid crystal display element 102 and is incident to the first liquid crystal display element 101, the light that is incident to the aperture of the reflection film 25 is output as the second transmission light-flux 56 to the side of the observer who observes the first liquid crystal display element 101. On the other hand, the light that is not incident to the aperture of the reflection film 25 is reflected from the reflector of the reflection film 25. The light repeats reflections between the reflection film 25 and the reflection film 94 or the reflection film 21 of the second liquid crystal display element 102, passes through the aperture of the reflection film 25 of the first liquid crystal display element 101 or the aperture 22 of the reflection film 21 of the second liquid crystal display element 102, and is output to the respective observer sides.

A part of the light emitted from the back surface of the optical waveguide 44 passes through the aperture 22 of the reflection film 21 of the second liquid crystal display element 102, and is output as the transmission light-flux 54 to the side of the observer who observes the second liquid crystal display element 102. The rest of the light emitted from the back surface of the optical waveguide 44 is reflected from the reflector of the reflection film 21 of the second liquid crystal display element 102, returns to the optical waveguide 44, passes through the optical waveguide 44, and is incident to the first liquid crystal display element 101.

A part of the light incident to the first liquid crystal display element 101 passes through the aperture of the reflection film 25 of the first liquid crystal display element 101, and is output to the side of the observer who observes the first liquid crystal display element 101. The rest of the light incident to the first liquid crystal display element 101 is reflected from the reflector of the reflection film 25 of the first liquid crystal display element 101, and returns to the optical waveguide 44 again. A part of the light that returns to the optical waveguide 44 is reflected from the reflection film 94, passes through the optical waveguide 44, and is incident to the first liquid crystal display element 101. The rest of the light that returns to the optical waveguide 44 passes through the optical waveguide 44, and is incident to the second liquid crystal display element 102.

Of the light that is incident to the second liquid crystal display element 102, the light that is incident to the aperture 22 of the reflection film 21 is output to the side of the observer who observes the second liquid crystal display element 102. The light that is not incident to the aperture 22 of the reflection film 21 is reflected from the reflector of the reflection film 21, and repeats reflections between the reflection film 21 and the reflection film 25 and the reflection film 94 of the first liquid crystal display element 101. The reflected light passes through the aperture of the reflection film 25 of the first liquid crystal display element 101 or the aperture 22 of the reflection film 21 of the second liquid crystal display element 102, and is output to the respective observer sides. As explained above, the light emitted from the optical waveguide 44 repeats reflections and diffusions several times, and is efficiently output to the side of the observer who observes the first liquid crystal display element 101 and the second liquid crystal display element 102 respectively. Therefore, bright display can be realized in the first liquid crystal display element 101 and the second liquid crystal display element 102 respectively.

The first liquid crystal display element 101 has a larger display area than that of the second liquid crystal display element 102. By employing the active matrix type, the display information amount of the first liquid crystal display element 101 is larger than that of the second liquid crystal display element 102. Therefore, the display of the second liquid crystal display element 102 can be made darker than that of the first liquid crystal display element 101, thereby making brighter display of the first liquid crystal display element 101.

In this case, instead of the reflection film 94 on the back surface of the optical waveguide 44, it is possible to use a reflection polarizing film of which one polarization axis is a transmission polarization axis, and the polarization axis orthogonal with the transmission polarization axis is a reflection polarization axis. With this arrangement, it is possible to prevent the observer of the first liquid crystal display element 101 from recognizing the profile and the status of the second liquid crystal display element 102. Further, the display of the first liquid crystal display element 101 can be made bright. As explained above, in disposing the reflection polarizing film, the transparent polarization axis of the reflection polarizing film is preferably substantially parallel with the transmission polarization axis of the partial polarization member 36 provided at the aperture 22 of the reflection film 21.

The optical member 37 can be provided between the first liquid crystal display element 101 and the backlight unit, or between the second liquid crystal display element 102 and the backlight unit, like in the eighth embodiment. With this arrangement, based on the collection of light, brighter transmission display can be realized. A similar effect can be obtained when the active matrix liquid crystal display element is used for the second liquid crystal display element 102. A similar effect can be obtained when the passive matrix liquid crystal display element is used for the first liquid crystal display element 101.

Figure 12:
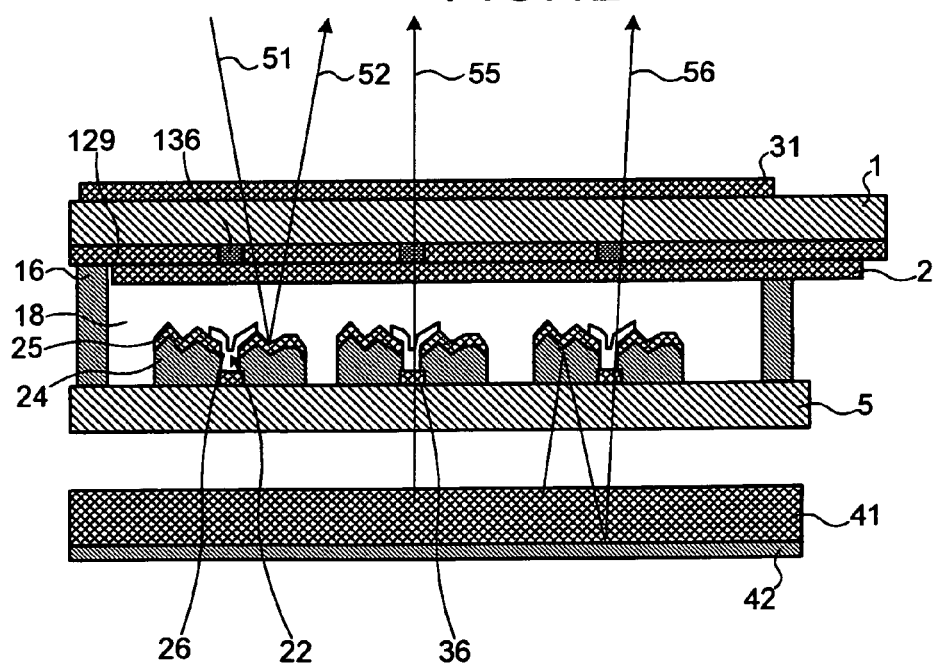
FIG. 12 is a cross-section of a liquid crystal display unit according to a tenth embodiment.

FIG. 12 is a cross-section of a liquid crystal display unit according to a tenth embodiment along the cut line A-A shown in FIG. 1. According to the tenth embodiment, an embedded partial polarization member 136 is provided on the surface of the first substrate 1 facing the liquid crystal layer in the fourth embodiment. This partial polarization member 136 is provided in the area that spatially overlaps with the aperture 22 of the reflection film 25. This partial polarization member 136 is not provided in the area that spatially overlaps with the reflector of the reflection film 25. Therefore, the partial polarization member 136 at the first substrate 1 side spatially overlaps with the partial polarization member 36 at the second substrate 5 side.

The partial polarization member 136 is covered with a protection insulation film 129 that prevents the partial polarization member 136 from being degraded. The insulation film 129 is embedded in a gap between adjacent partial polarization members 136, thereby eliminating steps generated due to presence or absence of the partial polarization member 136. Therefore, the surface of the insulation film 129 is flat. The first electrode 2 is provided on the surface of the insulation film 129. The first electrode 2 is covered with an orientation film (not shown). Other configurations are similar to those according to the fourth embodiment.

According to the tenth embodiment, the transmission light-fluxes 55 and 56 that pass through the aperture 22 of the reflection film 25 pass through the partial polarization member 36 provided at the aperture 22. The transmission light-fluxes 55 and 56 further pass through the partial polarization member 136 and the upper polarizing film 31, and are output to the observer side. The polarization axis direction of the partial polarization member 136 coincides with that of the upper polarizing film 31. Therefore, the polarization degree of the output light increases. Consequently, transmission display of a higher contrast than that according to the fourth embodiment can be realized. When the incident light 51 from the outside is reflected from the reflector of the reflection film 25 and is output to the observer side as the reflection light 52, this light does not pass through the partial polarization member 136 at the first substrate 1 side. Therefore, bright reflection display can be realized.

Figure 13:
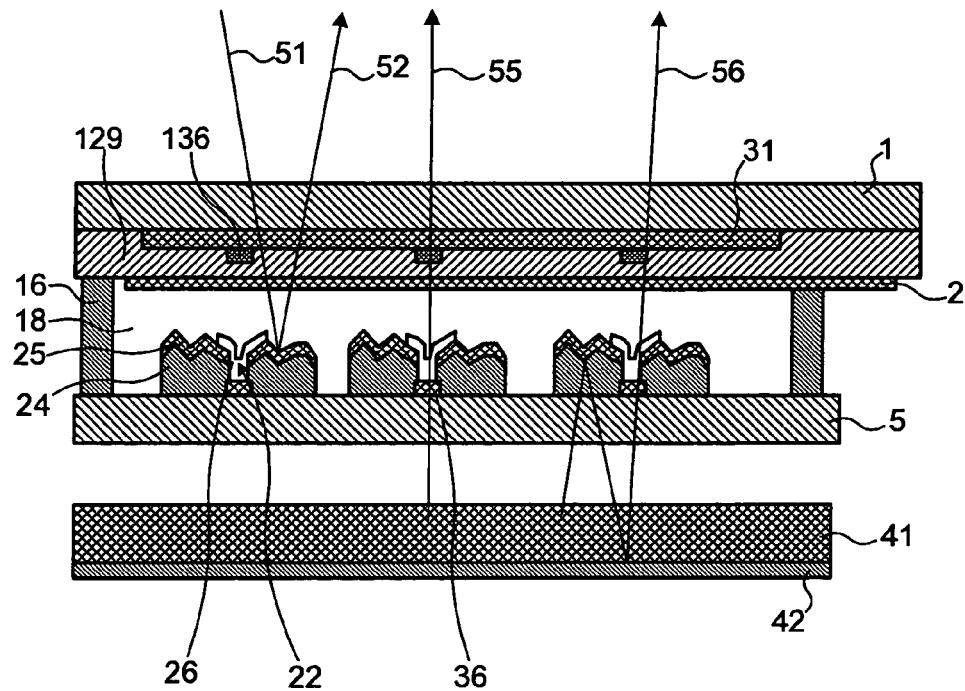
FIG. 13 is a cross-section of a liquid crystal display unit according to an eleventh embodiment.

FIG. 13 is a cross-section of a liquid crystal display unit according to an eleventh embodiment along the cut line A-A shown in FIG. 1. According to the eleventh embodiment, the upper polarizing film 31 is provided as an embedded polarizing film on the surface of the first substrate 1 facing the liquid crystal layer in the tenth embodiment. The partial polarization member 136 at the first substrate 1 side is provided on the surface of the upper polarizing film 31. Other configurations are similar to those according to the tenth embodiment.

According to the eleventh embodiment, transmission display of a high contrast and bright reflection display can be realized, like in the tenth embodiment. Since the upper polarizing film 31 is embedded, reliability is improved.

Figure 14:
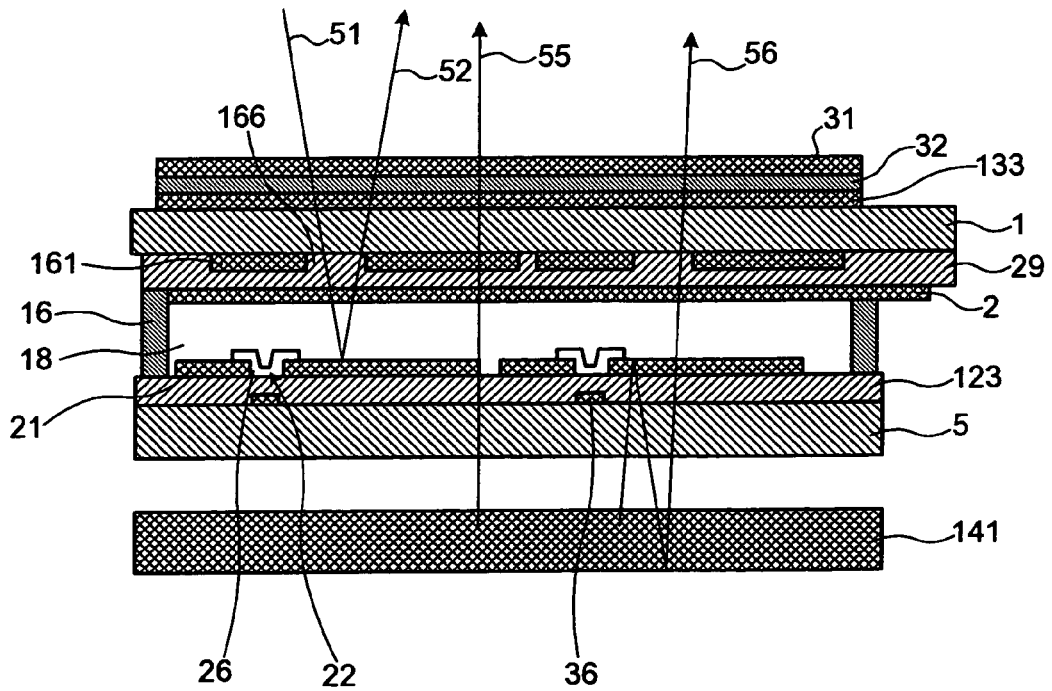
FIG. 14 is a cross-section of a liquid crystal display unit according to a twelfth embodiment.

FIG. 14 is a cross-section of a liquid crystal display unit according to a twelfth embodiment along the cut line A-A shown in FIG. 1. According to the twelfth embodiment, the embedded partial polarization member 36 is provided in the area that spatially overlaps with the aperture 22 of the reflection film 21 on the surface of the second substrate 5 facing the liquid crystal layer. The partial polarization member 36 is covered with a protection insulation film 123.

The insulation film 123 embeds the gap between adjacent partial polarization members 36, and eliminates steps generated due to presence or absence of the partial polarization member 36. Therefore, the surface of the insulation film 123 is flat, and the flat reflection film 21 is provided on the flat surface. The transparent lower electrode 26 is provided at the aperture 22 of the reflection film 21. The transmission lower electrode 26 is electrically connected to the reflection film 21. The orientation film that covers the insulation film 123, the reflection film 21, and the transmission lower electrode 26 is not shown in FIG. 14.

A color filter 161 is provided on the surface of the first substrate 1 facing the liquid crystal layer. An aperture 166 is provided in the color filter 161. A colored portion excluding the aperture 166 of the color filter 161 is provided in the area that spatially overlaps with the aperture 22 of the reflection film 21. The aperture 166 and the colored portion of the color filter 161 are provided in the area that spatially overlaps with the reflector of the reflection film 21. That is, the partial polarization member 36 and the colored portion of the color filter 161 spatially overlap each other. On the other hand, the aperture 166 of the color filter 161 does not spatially overlap with the partial polarization member 36.

The color filter 161 is covered with the protection insulation film 29 that prevents the color filter 161 from being degraded. The first electrode 2 is provided on the flat surface of the insulation film 29. The first electrode 2 is covered with an orientation film (not shown). The retardation film 32 is provided on the surface of the first substrate 1 opposite to the liquid crystal layer 18. The retardation film 32 is adhered with a diffusion bond that becomes a diffusion layer 133 to provide diffusion of light. The upper polarizing film 31 is provided on the surface of the retardation film 32.

An organic EL backlight 141 is used for the backlight unit. With this arrangement, loss of light due to the diffusion of the organic EL backlight 141 is prevented. Therefore, efficiency of the light emitted from the organic EL backlight 141 and output to the observer side is improved.

According to the twelfth embodiment, for the transmission display, the transmission light-fluxes 55 and 56 pass through the colored portion of the color filter 161, and are output to the observer side. Therefore, by setting a deep color to the colored portion, display of a deep color can be realized. On the other hand, for the reflection display, a part of the incident light 51 passes through the colored portion of the color filter 161, and is output to the observer side. The rest of the incident light 51 passes through the aperture 166 and is output to the observer side, without passing through the colored portion of the color filter 161, thereby realizing bright display. The liquid crystal display unit can have a configuration in combination with the provision of an embedded retardation film between the first substrate 1 and the second substrate 5.

Figure 15:
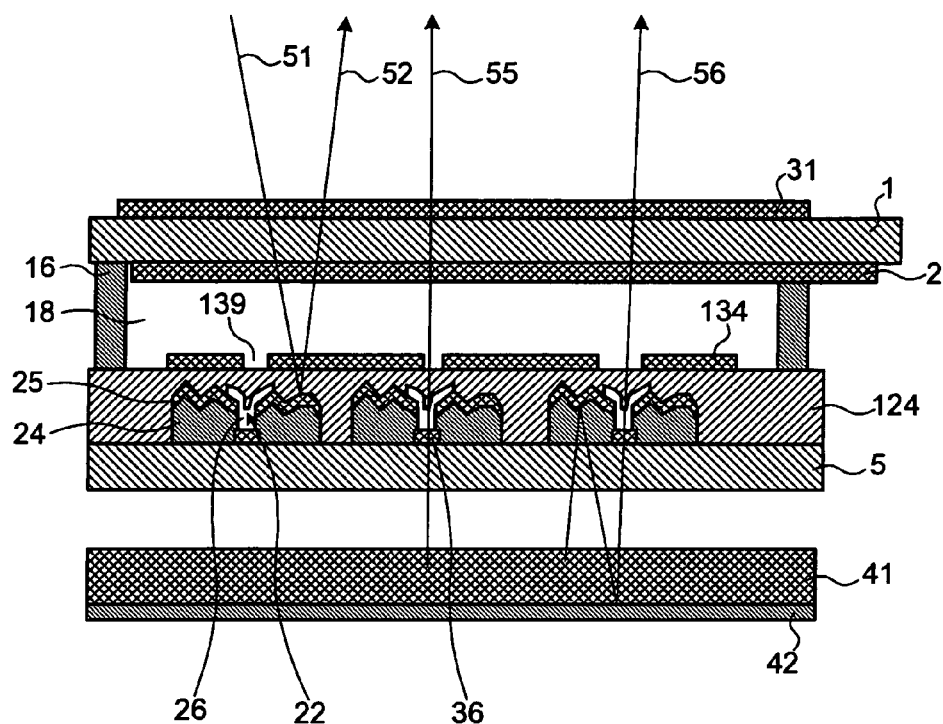
FIG. 15 is a cross-section of a liquid crystal display unit according to a thirteenth embodiment.

FIG. 15 is a cross-section of a liquid crystal display unit according to a thirteenth embodiment along the cut line A-A shown in FIG. 1. According to the thirteenth embodiment, the insulation film 24, the reflection film 25, and the transmission lower electrode 26 in the forth embodiment are covered with an insulation film 124. An embedded partial retardation film 134 is provided on the flat surface of the insulation film 124. An aperture 139 is provided on the partial retardation film 134.

The partial retardation film 134 is provided such that the aperture 139 and the aperture 22 of the reflection film 25 spatially overlap each other, and that parts other than the aperture 139 and the reflector of the reflection film 25 spatially overlap each other. Other configurations are similar to those according to the fourth embodiment. Respective orientation films at the first substrate 1 side and the second substrate 5 side are not shown in FIG. 15 (the orientation film is also omitted in FIG. 16 to FIG. 21).

The partial retardation film 134 is formed as follows. For example, a solution of an ultraviolet curable liquid crystal UCL-008-K1 as a liquid crystal monomer (a product name, manufactured by Dainippon Ink And Chemicals, Incorporated) is coated on the surface of the insulation film 124. Thereafter, the coating is dried, and is cooled slowly, thereby orienting the liquid crystal monomer. Then, the liquid crystal monomer is developed using an alkali developer to pattern in a desired shape, thereby forming a partial retardation film 134 made of a liquid crystal polymer.

Alternatively, the partial retardation film 134 can be formed in the following process. For example, an 8% solution of PLC-7023 (a product name, manufactured by Asahi Denka Co., Ltd.) is printed onto the insulation film 124 according to an inkjet system. The result is sintered at 80° C., reheated to 170° C. or above, and cooled slowly, thereby orienting a liquid crystal polymer. This liquid crystal polymer functions as the partial retardation film 134. By employing the inkjet system, the pattern of the partial retardation film 134 can be formed directly.

According to the thirteenth embodiment, for the transmission display, the transmission light-fluxes 55 and 56 pass through the partial polarization member 36, the liquid crystal layer 18, and the upper polarizing film 31 in this order, and are output to the observer side. On the other hand, for the reflection display, the incident light 51 from the outside passes through the upper polarizing film 31, the liquid crystal layer 18, and the partial retardation film 134 in this order, and is reflected from the reflector of the reflection film 25. The light then passes through the partial retardation film 134, the liquid crystal layer 18, and the upper polarizing film 31 in this order, and is output to the observer side. At this time, a phase difference of, for example, λ/4 is generated in the liquid crystal layer 18 and the partial retardation film 134 respectively. Therefore, a total phase difference of λ/2 can be generated. With this arrangement, as compared with the configuration of generating a phase difference of λ/2 by using only the liquid crystal layer 18, brighter display and darker display can be realized without providing the partial retardation film 134. As a result, reflection display of a high contrast can be realized.

Figure 16:
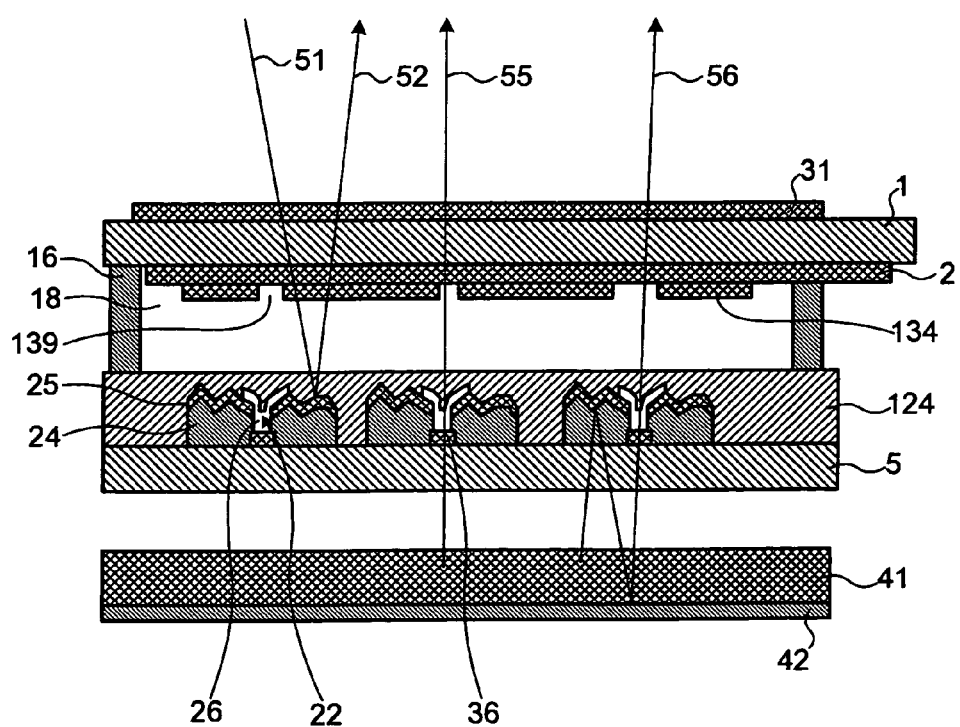
FIG. 16 is a cross-section of a liquid crystal display unit according to a fourteenth embodiment.

FIG. 16 is a cross-section of a liquid crystal display unit according to a fourteenth embodiment along the cut line A-A shown in FIG. 1. According to the fourteenth embodiment, the partial retardation film 134 in the thirteenth embodiment is provided on the surface of the first electrode 2. Other configurations are similar to those according to the thirteenth embodiment.

According to the fourteenth embodiment, for the transmission display, the optical paths of the transmission light-fluxes 55 and 56 are similar to those according to the thirteenth embodiment. For the reflection display, the incident light 51 from the outside passes through the upper polarizing film 31, the partial retardation film 134, and the liquid crystal layer 18 in this order, and is reflected from the reflector of the reflection film 25. The light then passes through the liquid crystal layer 18, the partial retardation film 134, and the upper polarizing film 31 in this order, and is output to the observer side. With this configuration, reflection display of a higher contrast can be realized than that of the display realized by the configuration having no partial retardation film 134.

Figure 17:
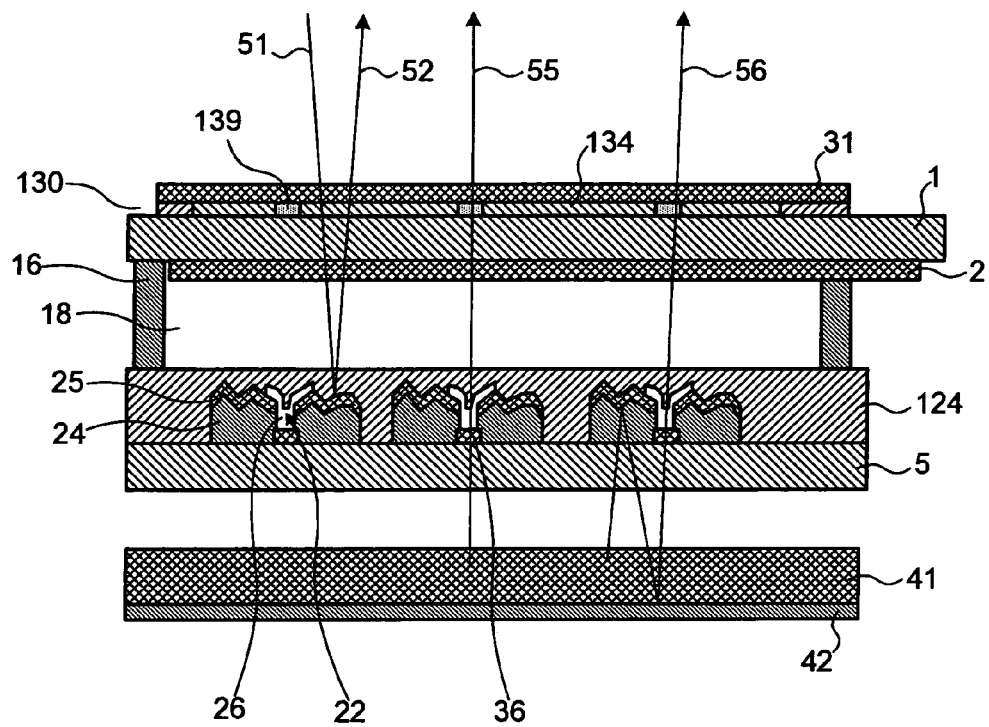
FIG. 17 is a cross-section of a liquid crystal display unit according to a fifteenth embodiment.

FIG. 17 is a cross-section of a liquid crystal display unit according to a fifteenth embodiment along the cut line A-A shown in FIG. 1. According to the fifteenth embodiment, the partial retardation film 134 is provided between the first electrode 2 and the upper polarizing film 31 in the thirteenth embodiment. The aperture 139 of the partial retardation film 134 and the periphery of the partial retardation film 134 are embedded with the insulation film 130. Other configurations are similar to those according to the thirteenth embodiment.

According to the fifteenth embodiment, for the transmission display, the optical paths of the transmission light-fluxs 55 and 56 are similar to those according to the thirteenth embodiment. For the reflection display, the incident light 51 from the outside passes through the upper polarizing film 31, the partial retardation film 134, and the liquid crystal layer 18 in this order, and is reflected from the reflector of the reflection film 25. The light then passes through the liquid crystal layer 18, the partial retardation film 134, and the upper polarizing film 31 in this order, and is output to the observer side. With this configuration, reflection display of a higher contrast can be realized than that of the display realized by the configuration having no partial retardation film 134.

Figure 18:
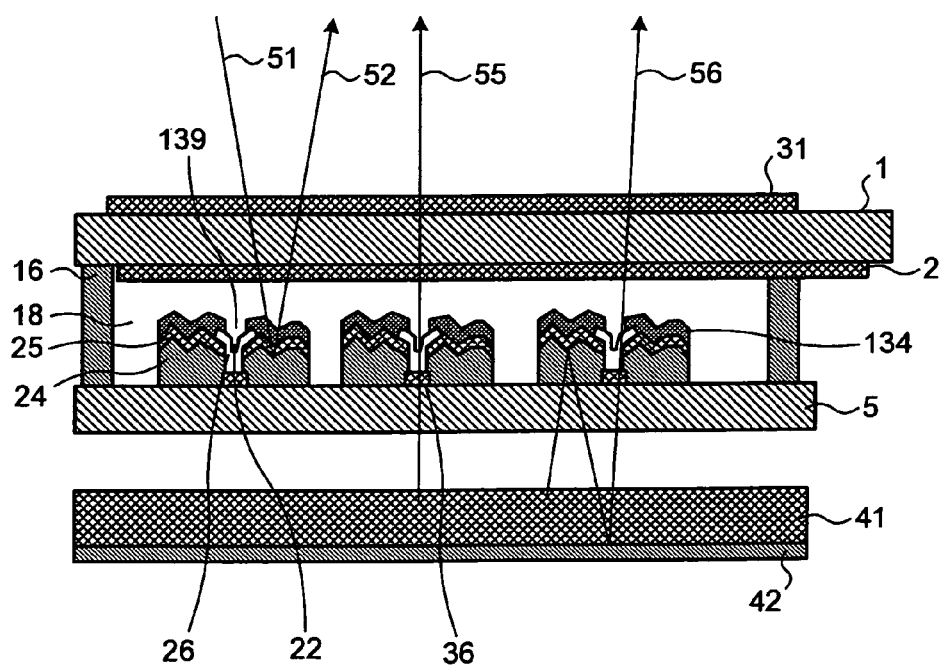
FIG. 18 is a cross-section of a liquid crystal display unit according to a sixteenth embodiment.

FIG. 18 is a cross-section of a liquid crystal display unit according to a sixteenth embodiment along the cut line A-A shown in FIG. 1. According to the sixteenth embodiment, the partial retardation film 134 is provided on the surface of the reflection film 25 in the thirteenth embodiment. The insulation film 124 that covers the reflection film 25 is not provided. Other configurations are similar to those according to the thirteenth embodiment.

According to the sixteenth embodiment, for the transmission display, the optical paths of the transmission light-fluxs 55 and 56 are similar to those according to the thirteenth embodiment. For the reflection display, the optical paths of the incident light 51 and the reflection light 52 are similar to those according to the thirteenth embodiment. With this configuration, reflection display of a higher contrast can be realized than that of the display realized by the configuration having no partial retardation film 134.

Figure 19:
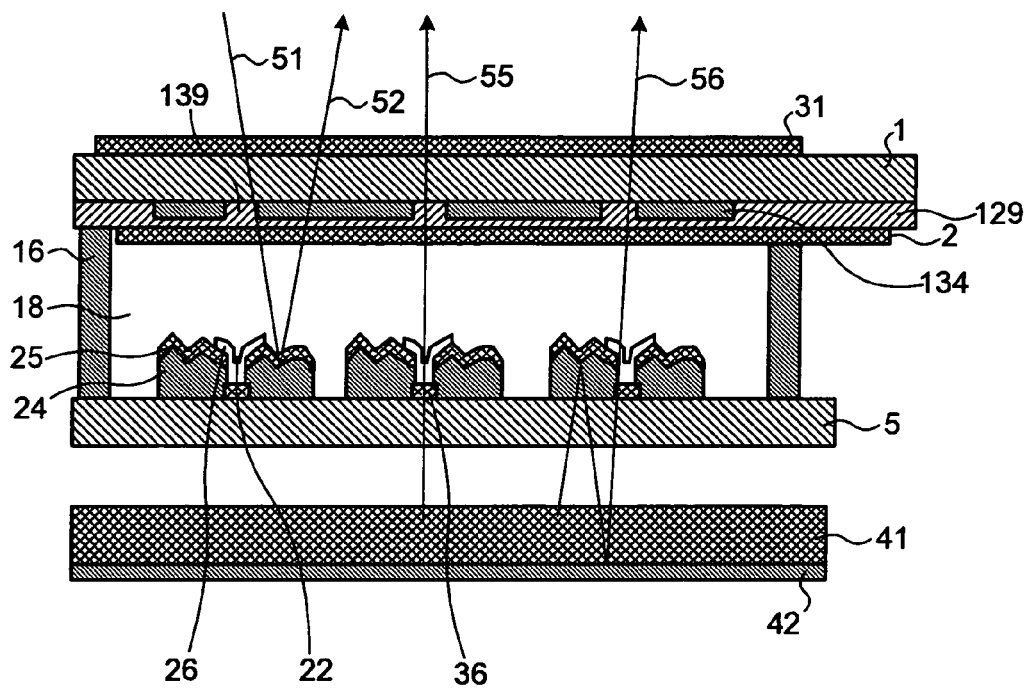
FIG. 19 is a cross-section of a liquid crystal display unit according to a seventeenth embodiment.

FIG. 19 is a cross-section of a liquid crystal display unit according to a seventeenth embodiment along the cut line A-A shown in FIG. 1. According to the seventeenth embodiment, the partial retardation film 134 is provided between the first substrate 1 and the first electrode 2 in the thirteenth embodiment. The aperture 139 of the partial retardation film 134 and the periphery of the partial retardation film 134 are embedded with the protection insulation film 129. The insulation film 124 that covers the reflection film 25 is not provided. Other configurations are similar to those according to the thirteenth embodiment.

According to the seventeenth embodiment, for the transmission display, the optical paths of the transmission light-fluxs 55 and 56 are similar to those according to the thirteenth embodiment. For the reflection display, the incident light 51 from the outside passes through the upper polarizing film 31, the partial retardation film 134, and the liquid crystal layer 18 in this order, and is reflected from the reflector of the reflection film 25. The light then passes through the liquid crystal layer 18, the partial retardation film 134, and the upper polarizing film 31 in this order, and is output to the observer side. With this configuration, reflection display of a higher contrast can be realized than that of the display realized by the configuration having no partial retardation film 134.

Figure 20:
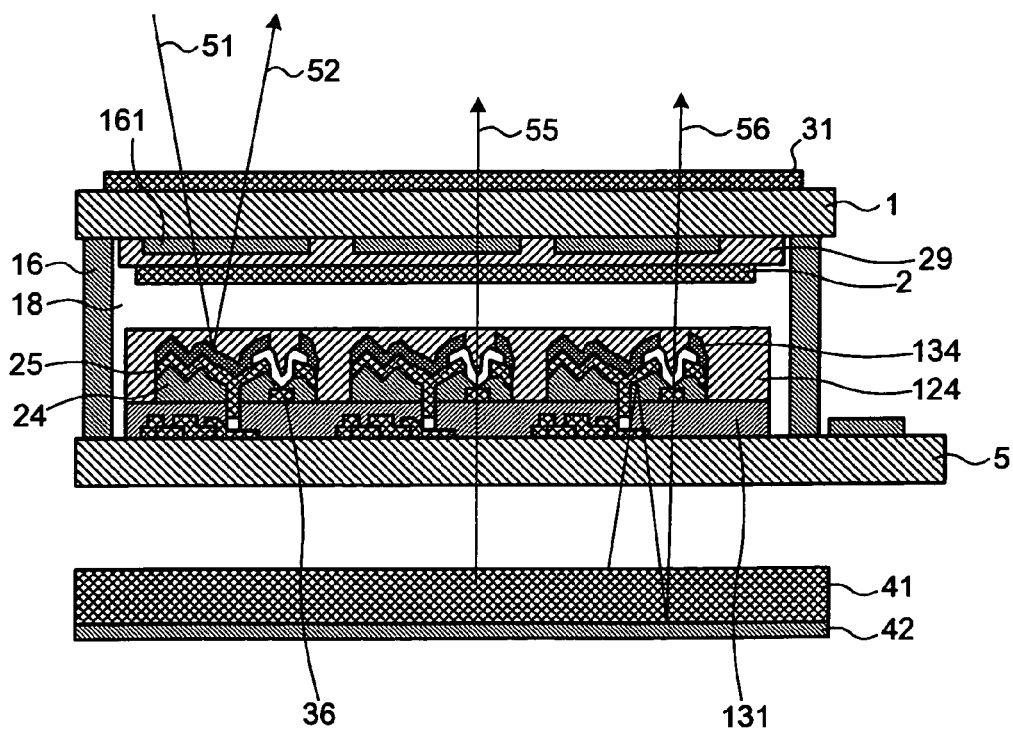
FIG. 20 is a cross-section of a liquid crystal display unit according to an eighteenth embodiment.

FIG. 20 is a cross-section of a liquid crystal display unit according to an eighteenth embodiment along the cut line A-A shown in FIG. 1. According to the eighteenth embodiment, the liquid crystal display unit has an active matrix having a switching element configured by a TFT for each pixel in the thirteenth embodiment. The partial retardation film 134 is provided on the surface of the reflection film 25. The TFT is covered with an insulation film 131, and the partial polarization member 36 is provided on the surface of the insulation film 131.

In the manufacturing process of the liquid crystal display element, the TFT is prepared, and the insulation film 131 is laminated on this TFT. Thereafter, the partial polarization member 36 is formed. With this arrangement, the partial polarization member 36 is prevented from being degraded in the high-temperature process at the time of preparing the TFT. The partial polarization member 36 is covered with the insulation film 24 on the surface of which the reflection film 25 is laminated. Therefore, the partial polarization member 36 is protected by the insulation film 131 and the insulation film 24.

According to the eighteenth embodiment, the partial retardation film 134 is provided on the surface of the reflection film 25. The color filter 161 protected by the insulation film 29 is provided between the first substrate 1 and the first electrode 2. Other configurations are similar to those according to the thirteenth embodiment. The configuration of the TFT, and the configuration of the connection between the liquid crystal display element and the electrode at the second substrate 5 side are as explained in the eighth embodiment.

According to the eighteenth embodiment, for the transmission display, the transmission light-fluxs 55 and 56 pass through the partial polarization member 36, the liquid crystal layer 18, the color filter 161, and the upper polarizing film 31 in this order, and are output to the observer side. On the other hand, for the reflection display, the incident light 51 from the outside passes through the upper polarizing film 31, the color filter 161, the liquid crystal layer 18, and the partial retardation film 134 in this order, and is reflected from the reflector of the reflection film 25. The light then passes through the partial retardation film 134, the liquid crystal layer 18, the color filter 161, and the upper polarizing film 31 in this order, and is output to the observer side. With this configuration, reflection display of a higher contrast can be realized than that of the display realized by the configuration having no partial retardation film 134.

Figure 21:
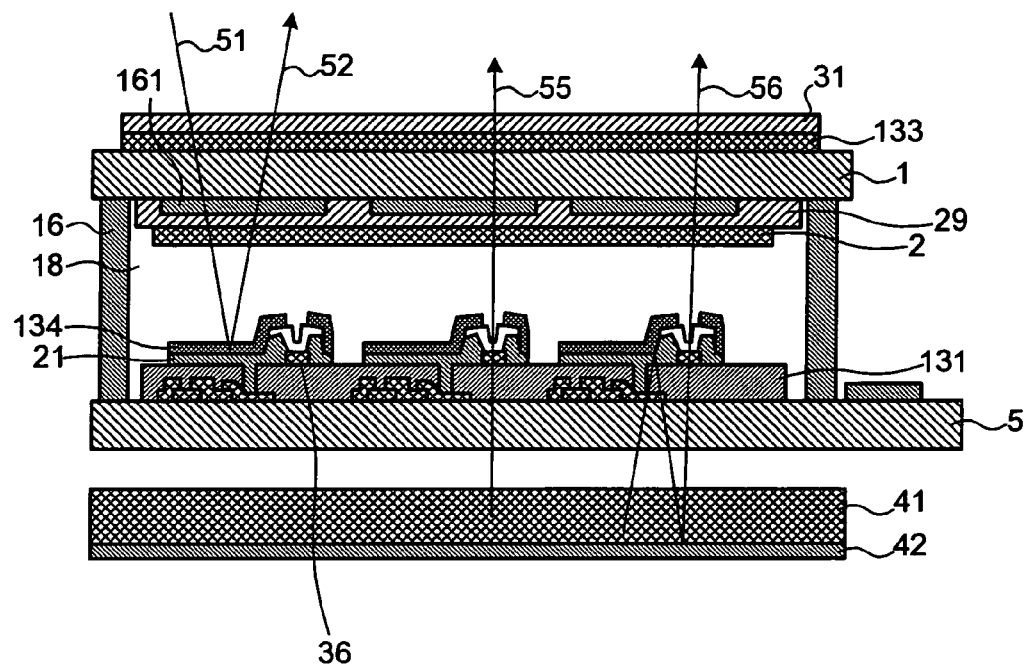
FIG. 21 is a cross-section of a liquid crystal display unit according to a nineteenth embodiment.
Figure 22:
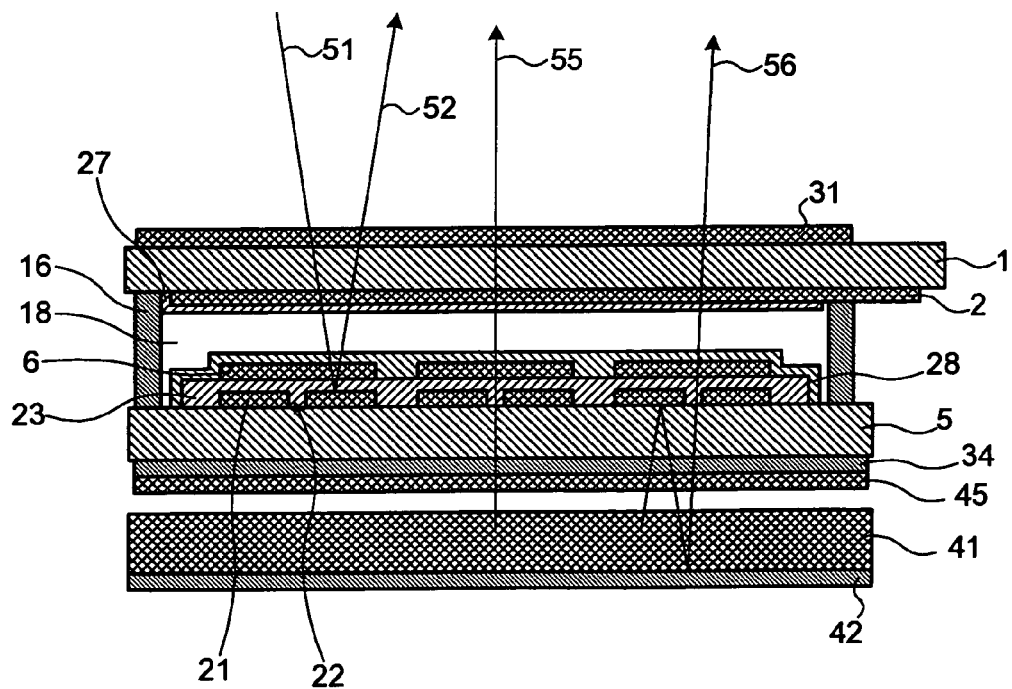
FIG. 22 is a cross-section of a conventional liquid crystal display unit.

FIG. 21 is a cross-section of a liquid crystal display unit according to a nineteenth embodiment along the cut line A-A shown in FIG. 1. According to the nineteenth embodiment, the reflection film 21 having a flat surface is used, instead of the insulation film 24 having the uneven surface and the reflection film 25 provided on the surface of the insulation film 24 in the eighteenth embodiment. Therefore, the partial retardation film 134 is provided on the surface of the reflection film 21. The partial polarization member 36 is protected by the insulation film 131 that covers the TFT and the reflection film 21. The upper polarizing film 31 is adhered to the first substrate 1 with a diffusion bond that becomes the diffusion layer 133. Other configurations are similar to those according to the eighteenth embodiment.

According to the nineteenth embodiment, for the transmission display, the optical paths of the transmission light-fluxs 55 and 56 are similar to those according to the eighteenth embodiment. For the reflection display, the incident light 51 from the outside passes through the upper polarizing film 31, the color filter 161, the liquid crystal layer 18, and the partial retardation film 134 in this order, and is reflected from the reflector of the reflection film 21. The light then passes through the partial retardation film 134, the liquid crystal layer 18, the color filter 161, and the upper polarizing film 31 in this order, and is output to the observer side. With this configuration, reflection display of a higher contrast can be realized than that of the display realized by the configuration having no partial retardation film 134.

The present invention is not limited to the above embodiments, and can be modified variously. For example, in each embodiment, the invention can be applied to a passive matrix liquid crystal display element, and also to an active matrix liquid crystal display element.

According to the present invention, at the time of transmission display, a part of light emitted from an auxiliary light source passes through a partial polarization member, and is output to an observer side. The rest of the light emitted from the auxiliary light source does not pass through the partial polarization member, is reflected from a reflector of a reflection film, and is returned to the auxiliary light source. The light is reflected from the reflection member of the auxiliary light source, and is output again to a liquid crystal display element. Light loss (absorption) is small in the reflection from the reflection film and the reflection from the reflection member of the auxiliary light source. Therefore, light is output efficiently from the aperture of the reflection film to the observer side, and bright transmission display can be realized.

According to the present invention, an optical member condenses light, thereby passing more light to the aperture of the reflection film. Therefore, the output light from the auxiliary light source can be utilized extremely effectively. Accordingly, brighter transmission display can be realized.

According to the present invention, a proportion of light that is reflected from the reflector of the reflection film, reflected from the auxiliary light source or the reflection member of the auxiliary light source, and returns to the aperture of the reflection film, can be increased. The light that passes through the aperture of the reflection film can be scattered. Further, the light that is reflected from the reflector of the reflection film and returns to the auxiliary light source can be scattered. Therefore, a proportion of light that returns from the reflector of the reflection film to the auxiliary light source is reflected from the auxiliary light source or the reflection member of the auxiliary light source, and is output from the aperture of the reflection film, can be increased.

According to the present invention, a reflection from an interface between the second substrate and air and a reflection from an interface between the optical member and air can be prevented. Therefore, light can be effectively output to the second substrate, thereby making bright display. Further, according to the present invention, the light reflected from the reflector of the reflection film returns to the auxiliary light source while being diffused. Therefore, the amount of light that returns from the reflector of the reflection film to the auxiliary light source, is reflected from the auxiliary light source or the reflection member of the auxiliary light source, and passes through the aperture of the reflection film, can be increased.

According to the present invention, a switching element is not visible from the observer side. Further, according to the present invention, the light that passes through the aperture of the reflection film passes through the partial polarization member provided at the aperture, passes through a second partial polarization member, and is output to the observer side. Therefore, a polarization degree of the output light becomes large. Accordingly, transmission display of a high contrast can be realized. Light that is incident from the outside is output to the observer side without passing through the second partial polarization member. Therefore, bright reflection display can be realized.

According to the present invention, brighter display and darker display can be realized than display realized by a configuration that generates a phase difference using only a liquid crystal layer without providing a partial retardation film. Therefore, reflection display of a high contrast can be realized. Further, according to the present invention, the light from the auxiliary light source passes through a colored portion of a color filter, and is output to the observer side. Therefore, when a deep color is set to the colored portion, transmission display of a deep color can be realized. For the reflection display, there are light that passes through the colored portion of the color filter and is output to the observer side, and light that passes through the aperture and is output to the observer side without passing through the colored portion of the color filter. Therefore, bright reflection display can be realized.

According to the present invention, a first liquid crystal display element and a second liquid crystal display element are provided by sandwiching auxiliary light source. Both the first liquid crystal display element and the second liquid crystal display element have a reflection film having a reflector and an aperture, and a partial polarization member at the aperture of the reflection film. With this arrangement, both liquid crystal display elements can intensively emit light to the respective apertures of the reflection films, thereby realizing bright display. Further, since a partial polarization member is locally provided, light can be returned to the auxiliary light source without substantially absorbing the light, and the light can be reflected again from the auxiliary light source to the respective apertures of the reflection films.

The liquid crystal display unit according to the present invention can realize bright transmission display. Therefore, the aperture of the reflection film through which transmission light-flux passes can be made small, thereby realizing bright reflection display. Since the bright reflection display can be realized, the rate a transmission display state at which the auxiliary light source is lit can be reduced. Therefore, power consumed by the auxiliary light source can be reduced. Since the visibility of transmission display is satisfactory even when the amount of light of the auxiliary light source is reduced, power consumed by the auxiliary light source can be reduced.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A liquid crystal display unit comprising:
   a first substrate;
   a second substrate;
   a liquid crystal layer that is sandwiched between the first substrate and the second substrate;
   a first electrode that is provided on the first substrate;
   a second electrode that is provided, corresponding to a pixel on a display, on the second substrate;
   a reflection film that is provided on the second substrate and includes a plurality of reflectors that is provided, corresponding to the pixel, with a space therebetween;
   an auxiliary light source that is provided on an opposite side of the second substrate with respect to the first substrate; and
   a partial polarization member that is provided, corresponding to the space, between the reflection film and the auxiliary light source, wherein
   the partial polarization member completely overlaps the space, while only partially overlapping each of the reflectors.

2. The liquid crystal display unit according to claim 1, wherein the second substrate is provided between the partial polarization member and the liquid crystal layer.

3. The liquid crystal display unit according to claim 1, wherein the partial polarization member is provided between the second substrate and the liquid crystal layer.

4. The liquid crystal display unit according to claim 1, wherein the auxiliary light source includes a reflection member that reflects light to the second substrate.

5. The liquid crystal display unit according to claim 1, further comprising an optical member that is provided between the reflection film and the auxiliary light source and condenses light from the auxiliary light source to the space.

6. The liquid crystal display unit according to claim 5, wherein the optical member is adhered to the second substrate.

7. The liquid crystal display unit according to claim 1, further comprising a diffusion layer that is provided between the reflection film and the auxiliary light source and diffuses light from the auxiliary light source.

8. The liquid crystal display unit according to claim 7, wherein the diffusion layer functions as an adhesive to adhere the optical member to the second substrate.

9. The liquid crystal display unit according to claim 1, wherein the second electrode is a transparent electrode, is provided on the space and electrically connected to the reflection film.

10. The liquid crystal display unit according to claim 1, further comprising a reflection polarizing film that is provided between the reflection film and the auxiliary light source, and has a transmission polarization axis and a reflection polarization axis, wherein
    the transmission polarization axis is substantially parallel with that of the partial polarization member, and
    the reflection polarization axis is substantially orthogonal with the transmission polarization axis.

11. The liquid crystal display unit according to claim 1, wherein the partial polarization member is a polarizing film.

12. The liquid crystal display unit according to claim 1, wherein the partial polarization member is a polarization polymer film.

13. The liquid crystal display unit according to claim 1, wherein the partial polarization member is a grid polarization member that includes a conductor and an insulator that are aligned alternately.

14. The liquid crystal display unit according to claim 1, wherein the partial polarization member is a reflection polarizing film.

15. The liquid crystal display unit according to claim 1, wherein the reflector of the reflection film has an uneven surface.

16. The liquid crystal display unit according to claim 1, further comprising any one of a switching element that is provided on the first substrate and connected to the first electrode, and a switching element that is provided on the second substrate and connected to the second electrode.

17. The liquid crystal display unit according to claim 16, wherein the switching element is provided in a specific area of any one of the first substrate and the second substrate, wherein the area corresponds to the reflector of the reflection film.

18. The liquid crystal display unit according to claim 1, further comprising a second partial polarization member that is provided in a specific area of the first substrate, wherein the area corresponds to the space of the reflection film.

19. The liquid crystal display unit according to claim 1, further comprising a partial retardation film that is provided in a specific area that corresponds to the reflector of the reflection film.

20. The liquid crystal display unit according to claim 1, further comprising a color filter that includes
    a first portion with color that is provided in a specific area that corresponds to the space of the reflection film; and
    a second portion that is provided in a specific area that corresponds to the reflector of the reflection film, and has any one of no color and a paler color than that of the first portion.

21. The liquid crystal display unit according to claim 1, further comprising:
    a third substrate;
    a fourth substrate;
    a third electrode that is provided on the third substrate;
    a fourth electrode that is provided on the fourth substrate, wherein
    the third substrate and the fourth substrate are provided on an opposite side of the auxiliary light source with respect to the first substrate and the second substrate.

22. The liquid crystal display unit according to claim 21, further comprising:
    a second reflection film that is provided on the fourth substrate and includes a plurality of reflectors with a space therebetween; and
    a third partial polarization member that is provided, corresponding to the space of the second reflection film, between the second reflection film and the auxiliary light source, wherein
    the third partial polarization member is provided in a specific area that corresponds to the reflector of the second reflection film.

* * * * *